United States Patent
Toudji et al.

(10) Patent No.: US 11,416,817 B2
(45) Date of Patent: Aug. 16, 2022

(54) EVENT EXTRACTION SYSTEMS AND METHODS

(71) Applicant: Apple Inc., Cupertino, CA (US)

(72) Inventors: Sofiane Toudji, San Francisco, CA (US); Erik M. Berget, San Francisco, CA (US); Craig Federighi, Los Altos Hills, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 482 days.

(21) Appl. No.: 15/897,043

(22) Filed: Feb. 14, 2018

(65) Prior Publication Data

US 2018/0349489 A1     Dec. 6, 2018

Related U.S. Application Data

(60) Provisional application No. 62/514,738, filed on Jun. 2, 2017.

(51) Int. Cl.
| | |
|---|---|
| *G06F 16/00* | (2019.01) |
| *G06Q 10/10* | (2012.01) |
| *G06F 16/35* | (2019.01) |
| *G06F 16/28* | (2019.01) |
| *G06F 16/31* | (2019.01) |

(Continued)

(52) U.S. Cl.
CPC .......... *G06Q 10/10* (2013.01); *G06F 16/2474* (2019.01); *G06F 16/285* (2019.01); *G06F 16/313* (2019.01); *G06F 16/353* (2019.01); *G06F 40/174* (2020.01); *G06F 40/20* (2020.01); *G06F 40/205* (2020.01); *G06F 40/279* (2020.01); *G06F 40/40* (2020.01); *G06Q 10/1093* (2013.01)

(58) Field of Classification Search
CPC .... G06F 16/285; G06F 16/313; G06F 16/353; G06F 16/2474
USPC .......................................................... 707/771
See application file for complete search history.

(56) References Cited

U.S. PATENT DOCUMENTS

| | | |
|---|---|---|
| 5,390,281 A | 2/1995 | Luciw et al. |
| 5,621,903 A | 4/1997 | Luciw et al. |

(Continued)

FOREIGN PATENT DOCUMENTS

CN    104992318 A    10/2015

OTHER PUBLICATIONS

U.S. Appl. No. 15/897,038, filed Feb. 14, 2018, Pending.
(Continued)

*Primary Examiner* — Ashish Thomas
*Assistant Examiner* — Rezwanul Mahmood
(74) *Attorney, Agent, or Firm* — Womble Bond Dickinson (US) LLP

(57) ABSTRACT

Events that are described in either structured data (e.g. HTML web page or email) or text in a natural language description can be extracted and entered into one or more calendars on a user's device. In one embodiment, selecting an add event command in a calendar application can cause the calendar application to search, without having received any search input, in a database of extracted events, and events extracted within a predetermined period of time can be suggested as events to add to the calendar. In one embodiment, an extracted event can cause a notification to be displayed to a user. Other embodiments are also described herein.

20 Claims, 21 Drawing Sheets

(51) Int. Cl.
*G06F 16/2458* (2019.01)
*G06F 40/20* (2020.01)
*G06F 40/40* (2020.01)
*G06F 40/174* (2020.01)
*G06F 40/205* (2020.01)
*G06F 40/279* (2020.01)

(56) References Cited

U.S. PATENT DOCUMENTS

| | | | |
|---|---|---|---|
| 5,946,647 A | 8/1999 | Miller et al. | |
| 6,618,709 B1 | 9/2003 | Sneeringer | |
| 7,383,308 B1* | 6/2008 | Groves | G06Q 10/109 709/212 |
| 7,552,393 B2 | 6/2009 | Hayes-Roth | |
| 7,627,830 B1* | 12/2009 | Espinoza | G06F 3/04812 715/764 |
| 7,912,828 B2 | 3/2011 | Bonnet et al. | |
| 7,979,457 B1* | 7/2011 | Garman | G06Q 30/0625 705/37 |
| 7,991,636 B1* | 8/2011 | Groves | H04L 51/00 705/7.18 |
| 8,200,520 B2 | 6/2012 | Chen et al. | |
| 8,296,266 B2* | 10/2012 | Lehmann | G06Q 10/109 707/654 |
| 8,301,636 B2 | 10/2012 | Stillion et al. | |
| 8,311,806 B2 | 11/2012 | Bonnet et al. | |
| 8,423,288 B2 | 4/2013 | Stahl et al. | |
| 8,489,388 B2 | 7/2013 | Bonnet et al. | |
| 8,539,359 B2* | 9/2013 | Rapaport | G06F 16/285 715/767 |
| 8,656,504 B2 | 2/2014 | Lurey et al. | |
| 8,660,790 B2 | 2/2014 | Stahl et al. | |
| 8,738,360 B2 | 5/2014 | Bonnet et al. | |
| 8,738,934 B2 | 5/2014 | Lurey et al. | |
| 8,788,935 B1* | 7/2014 | Hirsch | G06F 8/10 717/106 |
| 8,855,680 B1* | 10/2014 | Harris | H04M 1/72457 455/418 |
| 8,942,986 B2* | 1/2015 | Cheyer | G10L 15/26 704/275 |
| 8,983,500 B2* | 3/2015 | Yach | G06Q 10/109 455/418 |
| 9,024,747 B1* | 5/2015 | Faaborg | G08B 5/22 340/7.22 |
| 9,176,945 B1* | 11/2015 | Berner | G06F 40/205 |
| 9,207,084 B2 | 12/2015 | Stahl et al. | |
| 9,275,169 B2 | 3/2016 | Bonnet et al. | |
| 9,286,935 B1* | 3/2016 | Wilder | G11B 20/1217 |
| 9,426,119 B2* | 8/2016 | Liu | H04L 67/42 |
| 9,454,522 B2 | 9/2016 | Bonnet et al. | |
| 9,465,786 B2 | 10/2016 | Lurey et al. | |
| 9,489,371 B2 | 11/2016 | Bonnet et al. | |
| 9,582,482 B1* | 2/2017 | Sharifi | G06F 16/24578 |
| 9,692,874 B2* | 6/2017 | Raymann | H04L 67/22 |
| 9,767,488 B1* | 9/2017 | Wang | G06Q 30/0275 |
| 9,843,649 B1* | 12/2017 | Hampson | G06Q 30/0264 |
| 9,910,825 B1* | 3/2018 | Garman | G06F 17/00 |
| 10,115,154 B2* | 10/2018 | Lefebvre | G06Q 40/00 |
| 10,157,333 B1* | 12/2018 | Wang | G06N 3/04 |
| 10,311,122 B1* | 6/2019 | Banga | G06F 16/9577 |
| 10,496,705 B1* | 12/2019 | Irani | H04L 51/18 |
| 10,504,518 B1* | 12/2019 | Irani | G06F 16/90332 |
| 10,944,859 B2* | 3/2021 | Weinstein | G10L 15/22 |
| 11,076,039 B2* | 7/2021 | Weinstein | H04L 51/18 |
| 11,257,038 B2* | 2/2022 | Toudji | G06Q 10/1093 |
| 2002/0184321 A1* | 12/2002 | Fishman | G06Q 10/1095 715/963 |
| 2003/0120649 A1* | 6/2003 | Uchino | G06F 16/30 707/999.005 |
| 2004/0109025 A1 | 6/2004 | Hullot et al. | |
| 2004/0122823 A1 | 6/2004 | Baffes et al. | |
| 2004/0264672 A1* | 12/2004 | Paek | G10L 15/26 704/E15.045 |
| 2005/0131684 A1* | 6/2005 | Clelland | G10L 15/22 704/E15.04 |
| 2005/0160062 A1* | 7/2005 | Howard | G06F 7/00 |
| 2005/0177404 A1* | 8/2005 | Hyttinen | G06Q 10/00 719/321 |
| 2006/0064339 A1* | 3/2006 | Allred | G06Q 30/02 705/7.29 |
| 2007/0233736 A1 | 10/2007 | Xiong et al. | |
| 2008/0250334 A1* | 10/2008 | Price | G06Q 30/0251 715/753 |
| 2008/0288476 A1* | 11/2008 | Kim | G06F 16/9577 |
| 2009/0150345 A1* | 6/2009 | Van Luchene | G06F 16/958 |
| 2009/0235280 A1* | 9/2009 | Tannier | G06Q 10/00 719/318 |
| 2009/0271281 A1* | 10/2009 | Kang | G06Q 30/0601 705/26.1 |
| 2010/0017360 A1* | 1/2010 | Bansal | H04L 51/28 707/E17.044 |
| 2010/0274770 A1* | 10/2010 | Gupta | G06F 16/285 707/688 |
| 2011/0106892 A1 | 5/2011 | Nelson et al. | |
| 2012/0084644 A1* | 4/2012 | Robert | G06F 16/168 715/255 |
| 2012/0095819 A1* | 4/2012 | Li | G06Q 30/02 705/14.23 |
| 2012/0191585 A1* | 7/2012 | Lefebvre | G06Q 10/10 705/35 |
| 2012/0232786 A1* | 9/2012 | Chen | G06Q 10/109 707/769 |
| 2012/0284105 A1* | 11/2012 | Li | G06Q 30/02 705/14.23 |
| 2013/0041590 A1* | 2/2013 | Burich | G06F 11/3006 702/19 |
| 2013/0041697 A1* | 2/2013 | Bergot | G06Q 10/02 705/5 |
| 2013/0103420 A1* | 4/2013 | Massoumi | G16H 10/60 705/3 |
| 2013/0110505 A1* | 5/2013 | Gruber | G06F 16/3344 704/9 |
| 2013/0191892 A1* | 7/2013 | Cadden | H04L 63/101 726/5 |
| 2013/0254855 A1* | 9/2013 | Walters | G06F 21/50 726/5 |
| 2013/0275164 A1* | 10/2013 | Gruber | G10L 15/22 705/5 |
| 2013/0297551 A1* | 11/2013 | Smith | G06N 20/00 706/48 |
| 2013/0297688 A1 | 11/2013 | Zheng | |
| 2014/0095509 A1 | 4/2014 | Patton | |
| 2014/0222857 A1* | 8/2014 | Chen | G06F 16/248 707/769 |
| 2014/0278051 A1* | 9/2014 | McGavran | G01C 21/3492 706/45 |
| 2014/0288990 A1 | 9/2014 | Moore | |
| 2014/0344745 A1* | 11/2014 | Possing | G06Q 10/109 715/772 |
| 2014/0358632 A1 | 12/2014 | Graff et al. | |
| 2014/0359464 A1 | 12/2014 | Possing | |
| 2014/0372867 A1* | 12/2014 | Tidhar | G06F 40/143 715/234 |
| 2015/0019642 A1* | 1/2015 | Wang | G06Q 50/01 709/204 |
| 2015/0081116 A1* | 3/2015 | Endrizzi | H04L 67/10 700/284 |
| 2015/0095086 A1 | 4/2015 | Gopinath et al. | |
| 2015/0111603 A1 | 4/2015 | Rivard et al. | |
| 2015/0149879 A1* | 5/2015 | Miller | G06F 16/2477 715/226 |
| 2015/0154269 A1* | 6/2015 | Miller | G06F 16/904 715/780 |
| 2015/0193392 A1* | 7/2015 | Greenblatt | G06Q 10/109 715/205 |
| 2015/0199651 A1* | 7/2015 | Raman | G06Q 10/1095 705/7.19 |
| 2015/0248651 A1 | 9/2015 | Akutagawa | |

(56) References Cited

U.S. PATENT DOCUMENTS

| | | | |
|---|---|---|---|
| 2015/0262090 A1* | 9/2015 | Hiatt | G06Q 10/025 705/5 |
| 2015/0278199 A1* | 10/2015 | Hazen | G06F 40/205 704/9 |
| 2015/0346983 A1* | 12/2015 | Adler | G06Q 10/1093 715/772 |
| 2015/0347534 A1* | 12/2015 | Gross | H04L 51/28 707/722 |
| 2015/0347985 A1* | 12/2015 | Gross | G06F 16/2379 705/7.19 |
| 2015/0370885 A1* | 12/2015 | Kushmerick | H04L 41/0604 707/737 |
| 2016/0019316 A1* | 1/2016 | Murphey | G06F 16/9032 707/722 |
| 2016/0034827 A1* | 2/2016 | Morris | G06F 3/04842 705/5 |
| 2016/0098851 A1 | 4/2016 | Wu et al. | |
| 2016/0111010 A1* | 4/2016 | Adachi | G09B 7/00 434/362 |
| 2016/0179835 A1* | 6/2016 | Mika | G06F 16/9535 707/794 |
| 2016/0239165 A1* | 8/2016 | Chen | H04L 51/32 |
| 2016/0334797 A1 | 11/2016 | Ross et al. | |
| 2016/0349936 A1* | 12/2016 | Cho | G06F 3/0481 |
| 2016/0357861 A1 | 12/2016 | Carlhian et al. | |
| 2016/0360336 A1* | 12/2016 | Gross | H04W 4/025 |
| 2016/0360382 A1* | 12/2016 | Gross | G06F 3/04186 |
| 2016/0371620 A1* | 12/2016 | Nascenzi | G06Q 10/06314 |
| 2016/0373293 A1* | 12/2016 | Kushmerick | H04L 41/0613 |
| 2017/0078321 A1* | 3/2017 | Maylor | H04L 63/1433 |
| 2017/0083552 A1* | 3/2017 | Abolafia | G06F 17/40 |
| 2017/0090466 A1* | 3/2017 | Uomori | G05B 23/0216 |
| 2017/0098012 A1* | 4/2017 | Zhu | G06F 16/9535 |
| 2017/0098070 A1* | 4/2017 | Ning | G06F 21/85 |
| 2017/0104629 A1 | 4/2017 | Cobb | |
| 2017/0169366 A1 | 6/2017 | Klein et al. | |
| 2017/0180488 A1* | 6/2017 | Goldstein | G06Q 10/1093 |
| 2017/0200129 A1* | 7/2017 | Garg | G06Q 10/1093 |
| 2017/0285632 A1 | 10/2017 | Bostick et al. | |
| 2017/0295260 A1* | 10/2017 | Pierce | G06F 9/445 |
| 2017/0308517 A1* | 10/2017 | Josifovski | G06Q 10/10 |
| 2017/0314939 A1 | 11/2017 | Carter et al. | |
| 2017/0314942 A1 | 11/2017 | Moncayo | |
| 2017/0351778 A1* | 12/2017 | Sperling | G06F 40/169 |
| 2017/0357716 A1 | 12/2017 | Bellegarda et al. | |
| 2017/0357904 A1* | 12/2017 | Adler | G06Q 10/109 |
| 2017/0357917 A1* | 12/2017 | Holmes | G06Q 10/1093 |
| 2018/0012130 A1 | 1/2018 | Taylor et al. | |
| 2018/0013720 A1* | 1/2018 | Sachdev | H04L 61/6004 |
| 2018/0032424 A1* | 2/2018 | Horesh | G06F 11/3692 |
| 2018/0052676 A1* | 2/2018 | Charters | G06F 8/65 |
| 2018/0060300 A1* | 3/2018 | Radostev | G06F 40/35 |
| 2018/0061401 A1* | 3/2018 | Sarikaya | G06F 40/174 |
| 2018/0077088 A1* | 3/2018 | Cabrera-Cordon | H04L 67/306 |
| 2018/0082221 A1* | 3/2018 | DiTomaso | G06Q 10/1093 |
| 2018/0121881 A1* | 5/2018 | Kumar | G06F 3/04845 |
| 2018/0150869 A1* | 5/2018 | Finnegan | G06Q 30/0239 |
| 2018/0205741 A1* | 7/2018 | Roussos | G06F 21/31 |
| 2018/0246968 A1 | 8/2018 | Barker et al. | |
| 2018/0259351 A1 | 9/2018 | Broyles et al. | |
| 2018/0267947 A1* | 9/2018 | Miller | G06F 16/2477 |
| 2018/0322470 A1* | 11/2018 | Ferre | G06Q 10/1095 |
| 2018/0349469 A1* | 12/2018 | Toudji | G06F 40/205 |
| 2018/0349471 A1* | 12/2018 | Toudji | G06F 40/205 |
| 2018/0349488 A1* | 12/2018 | Toudji | G06F 16/353 |
| 2018/0349489 A1* | 12/2018 | Toudji | G06F 40/174 |
| 2019/0005458 A1* | 1/2019 | Mallipudi | G06Q 10/1093 |
| 2019/0019161 A1* | 1/2019 | Yasarapu | G06Q 10/1095 |
| 2019/0050945 A1* | 2/2019 | Ash | H04L 67/22 |
| 2019/0295155 A1* | 9/2019 | Lefebvre | G06Q 40/00 |
| 2019/0370292 A1* | 12/2019 | Irani | G06F 3/0482 |
| 2019/0371316 A1* | 12/2019 | Weinstein | H04L 51/18 |
| 2019/0371317 A1* | 12/2019 | Irani | G10L 15/22 |
| 2019/0373102 A1* | 12/2019 | Weinstein | G06F 3/0482 |
| 2020/0184278 A1* | 6/2020 | Zadeh | G06K 9/6264 |
| 2020/0279009 A1* | 9/2020 | Nishizawa | G06F 3/0482 |
| 2021/0152684 A1* | 5/2021 | Weinstein | G06F 16/90328 |
| 2021/0224843 A1* | 7/2021 | Dabas | G06Q 50/01 |
| 2021/0286857 A1* | 9/2021 | Guillon | G06Q 30/0601 |

OTHER PUBLICATIONS

U.S. Appl. No. 15/897,047, filed Feb. 14, 2018, Pending.

U.S. Appl. No. 15/897,053, filed Feb. 14, 2018, Pending.

PCT International Preliminary Report on Patentability for PCT/US2018/024182 dated Dec. 3, 2019, 9 pages.

The Non-Final Office Action for U.S. Appl. No. 15/897,038 dated Jan. 6, 2020, 34 pages.

The Non-Final Office Action for U.S. Appl. No. 15/897,047 dated Apr. 1, 2020, 32 pages.

The Non-Final Office Action for U.S. Appl. No. 15/897,053 dated Jul. 26, 2020, 12 pages.

The Final Office Action for U.S. Appl. No. 15/897,053 dated Feb. 28, 2020, 14 pages.

PCT International Search Report and Written Opinion of the International Searching Authority for PCT/US2018/024182 dated Jun. 5, 2018.

John Foley, Michael Bendersky, Vanja Josifovski, "Learning to Extract Local Events from the Web", Proceedings of the 38th International ACM SIGIR Conference on Research and Development in Information Retrieval, SIGIR '15, Aug. 9, 2015, pp. 423-432.

Extended European Search Report from related EP Application No. 21177868.3 dated Oct. 27, 2021 (7 pages).

* cited by examiner

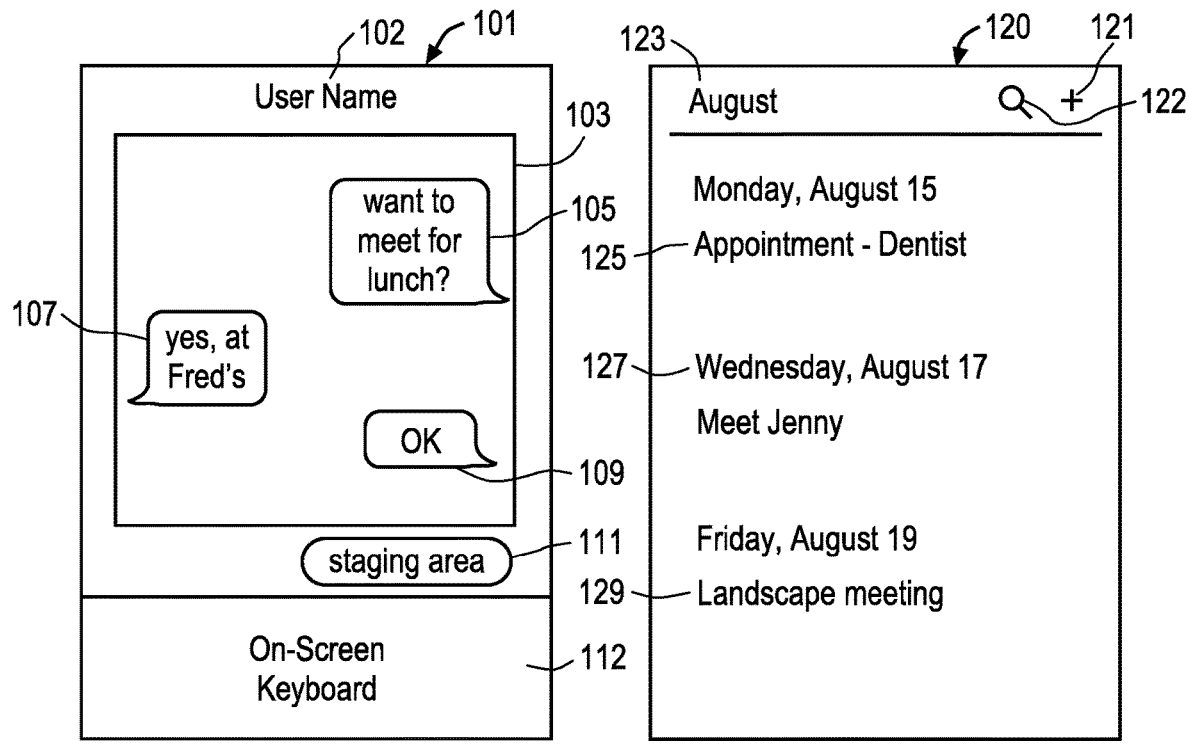
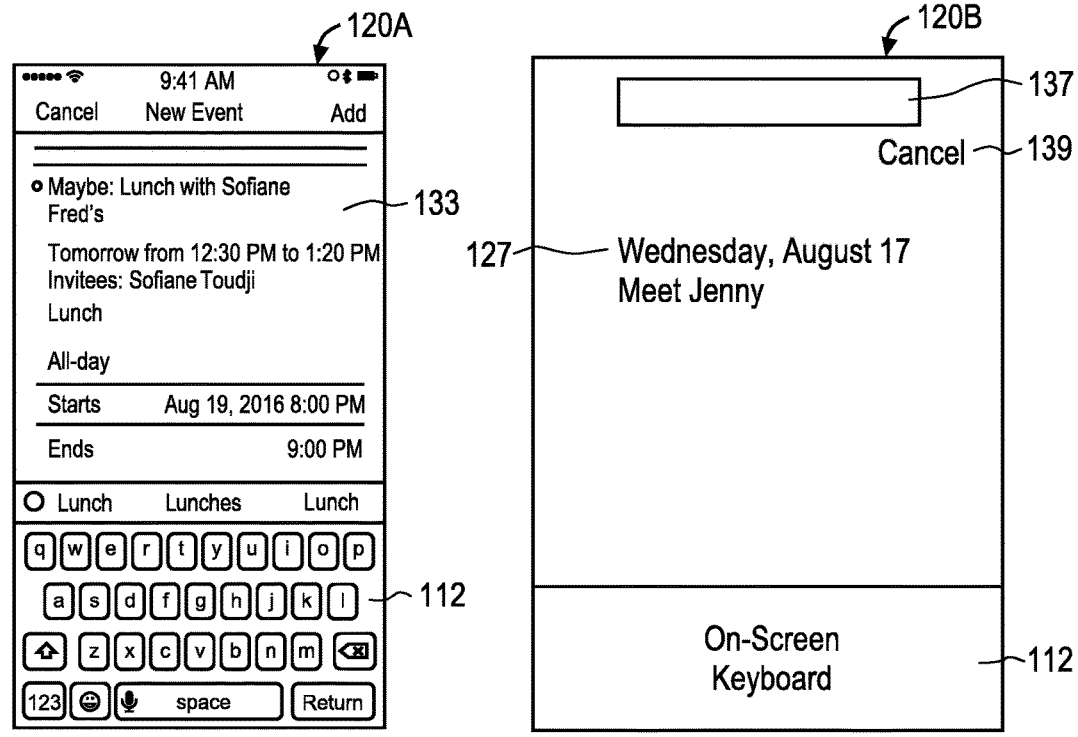

Car rentals

- pickup location name
- pickup location address
- pickup agency telephone number
- dropoff location name
- dropoff location address
- dropoff agency telephone number
- pickup time
- drop off time
- reservation number
- checkin url (link to vendor website)
- cancel reservation url (link to vendor website)
- modify reservation url (link to vendor website)
- reservation status
- name the reservation was made under
- vendor name
- price
- vehicle type/brand/color –> Produces 2 events: 1 event for Car rental pickup, and 1 event for Car rental drop off

Figure 12A

Ticketed events

- location
- telephone
- seat(s) row/number/section
- ticket download url (link to vendor website)
- ticket number
- price
- reservation status
- name the reservation was made under
- start date
- start time –> Produces 1 event

Figure 12B

Restaurant reservations
- location
- party size
- telephone
- booking agent
- description (free text)
- reservation status
- name the reservation was made under
- cancel reservation url (link to vendor website)
- modify reservation url (link to vendor website)
- confirm reservation url (link to vendor website)
- start date
- start time –> Produces 1 event

Figure 12C

Hotels reservations
- hotel website
- hotel name
- hotel telephone
- hotel location
- reservation status
- name the reservation was made under
- cancel reservation url (link to vendor website)
- modify reservation url (link to vendor website)
- price
- provider
- invited by
- start date
- start time –> Produces 1 event

Figure 12D

Flights
- airline name
- airline IATA code
- flight number
- departure airport name
- departure airport IATA code
- arrival airport
- arrival airport IATA code
- checkin url (link to vendor website)
- reservation ID
- ticket number
- reservation status
- passenger name(s)
- total price
- reserved seat number
- seating type
- membership program number
- membership program name
- start date
- start time (when the plane is scheduled to take off)
- end date
- end time (when the plane is scheduled to land)

–> Produces as many events as extracted flight legs

Figure 12E

Social invites
- location address/name
- description
- start date
- start time
- event URL (link to vendor website)
- name of the person who sent the invite –> Produces 1 event

Figure 12F

For all events categories
- Must have a reservation id OR have a confirmation message in natural language, e.g., "thank you for your reservation"
- Must have a start date and time
- Date and time must be correctly formatted according to the ISO 8601 date format
- Validate that extracted URLs are correctly formed

Figure 13A

Car rentals
- Must have a provider name (e.g., Hertz)
- Must have a drop off date / time OR a pickup address (in order to determine timezone)

Figure 13B

Ticketed events
- Must have an event name (e.g., concert name)
- Must have a ticket number

Figure 13C

Restaurant reservations
- Party size must be positive

Figure 13D

Hotels reservations
- Must have a check-in time
- Must have a drop off date & time OR a hotel address (in order to determine timezone)

Figure 13E

Flights
- Airline IATA code must be present and valid
- Airline IATA codes must be 2 characters exactly only alphanumerical
- Must have flight number
- Must have departure AND arrival time
- Must have departure AND arrival airport codes OR airport names
- Airport codes must be 3 characters exactly with only letters

Figure 13F

Social invites
- Must have an event name (e.g., Birthday Party)

Figure 13G

EVENT EXTRACTION SYSTEMS AND METHODS

This application claims the benefit of U.S. Provisional Patent Application No. 62/514,738, filed Jun. 2, 2017, which is incorporated herein by reference.

BACKGROUND

Users of data processing systems often send messages (e.g., text messages) or emails about events such as a dinner or lunch at a restaurant or a night at the movies, etc. Moreover, users of data processing systems often use web browsers to make reservations for restaurants, car rentals, ticketed events (e.g., a baseball game or a movie, etc.), flights, hotels, etc.

Data processing systems, in the past, have been enhanced to include techniques that recognize different types of data, such as events. See, for example, U.S. Pat. Nos. 7,912,828; 8,423,288; and 8,738,360. These techniques rely upon user interaction to utilize the extracted data.

SUMMARY OF THE DESCRIPTION

Various aspects and embodiments described herein relate to the extraction of events from different types of data. In one embodiment, events can be extracted from natural language description, such as certain types of emails or text messages or other text content. In another embodiment, events can be extracted from structured data such as HTML (e.g., web pages or some types of emails, etc.).

A method which extracts events from natural language descriptions of events can include the following operations: extracting an event from text having a natural language description; adding the extracted event to a database containing one or more extracted events; recording data representing a first time associated with the extracted event; displaying a user interface of a calendar application, wherein the user interface of the calendar application includes an add event command; receiving a selection of the add event command; determining, in response to the selection, whether the first time which is associated with the event is within a period of time of a current time; displaying at least a portion of the extracted event in the calendar user interface if the first time is within the period of time of the current time. In one embodiment, recently extracted events can be suggested as a new event to add to a calendar in response to a command to add a new event. In one embodiment, the display of the extracted event can be the result of a search through an extracted event database, and the results of the search display auto completion suggestions of possible extracted events which can be suggested even if no characters are entered into a search input field, which can be referred to as a zero word auto completion suggestion. In other words, the displaying of at least a portion of the extracted event in the calendar user interface can be performed while zero characters are received in a search input field in the calendar user interface. When the first time is beyond the period of time of a current time, then input characters in the search input field can be required in order to retrieve the extracted event as a possible search result in an auto completion suggestion set of search results. The natural language description can be part of a text message or email.

An alternative embodiment can offer auto completion suggestions from a search of extracted events when a user selects an add event command without regard to a time associated with each extracted event. In this alternative embodiment, these auto completion suggestions obtained by searching an extracted event database can be provided without any characters being entered into a search input field (a zero word auto completion suggestion) or after characters have been entered into the field, which match events in the extracted event database.

In one embodiment, the first time which is associated with an extracted calendar event can be one of: (a) a time of receipt of a text message or email; or (b) a time that the extracted event was extracted when the text message or email was displayed; or (c) a time that the extracted event was added to the extracted event database.

In one embodiment, the method can further include determining an expiration date for the extracted event based on data extracted from the natural language description; and removing the extracted event from the database on or after the expiration date. In one embodiment, the database containing extracted events can include a data structure in which the extracted events are ordered by time from most recent to least recent. In one embodiment, the method can further include receiving a selection of the displayed extracted event in the calendar user interface and displaying, in response to the selection of the displayed extracted event, a calendar event creation panel that is pre-populated with data from the extracted event to allow editing of an entry based on the extracted event into a calendar maintained by the calendar application. In one embodiment, the extracted events may be placed in a sub-calendar, which can be characterized as a "found in application" calendar that is segregated from a user's main calendar. In one embodiment, the calendar application may support multiple sub-calendars, such as a work calendar, home calendar, etc. as described in U.S. published application US2004/0109025.

Another embodiment in which events are extracted from a natural language description can include the following operations: extracting an event from text having a natural language description; adding the extracted event to a database containing one or more extracted events; displaying a user interface of a calendar application, the user interface including a set of one or more dates in a calendar format; receiving a selection of one of the one or more dates in the calendar format; searching, in response to the selection, the database for any extracted events on the selected date, the searching performed while zero characters have been received in a search input field used to receive and cause a search of the database; displaying, as one or more candidate events, each of the extracted events in the database on the selected date. In one embodiment, the method can further include determining an expiration date for the extracted event based on data extracted from the natural language description; and removing the extracted event from the database on or after the expiration date.

Another aspect described herein relates to the extraction of one or more events while the user uses a web browser to make a reservation or to otherwise create an event. In one embodiment, a method can include the following operations: receiving a document from a domain; comparing the domain to a set of domains in a white list of domains; determining, if the domain is in the set of domains, whether to continue processing the document based upon at least one of a title of the document or a uniform resource identifier (URL) of the document; extracting, from the document if processing is continued, structured data representing a candidate calendar event; adding the candidate calendar event to a calendar database; and presenting a notification to a user, the notification showing at least a portion of data about the candidate calendar event. In one embodiment, the determination of whether to continue processing the document can be done repeatedly through different web pages of the same domain (or a domain known to be related to the original domain) through the process of creating the event while using the web browser. In one embodiment, the document is one of a web page or an email or text message containing structured data from a business. In one embodiment, the white list is a data structure in memory of the process of the web browser, and the data structure is a memory mapped trie and the comparing is a lookup operation in the memory mapped trie. In one embodiment, the determination of whether to continue processing can use a machine learned classifier that is trained on manually labeled examples that are used to learn, based on characterization of title of a web page or subject line of an email how to classify the structured data. In one embodiment, the characterization indicates whether the email or web page is a confirmation of a reservation or an advertisement (a non-event) or a promotion which is not considered an event. In one embodiment, the calendar database is a private local calendar database that is encrypted if stored in a user's private cloud storage account, and the candidate calendar event can be displayed in a sub-calendar that can be one of several sub-calendars displayable in a calendar application.

In one embodiment, the notification can include at least one of: (a) a close command that dismisses display of the notification while retaining the candidate calendar event; or (b) a select command that shows the candidate calendar event in a user interface of the calendar application, wherein the candidate calendar event is editable in the calendar application; or (c) a delete command that deletes the candidate calendar event from the calendar database. In one embodiment, the notification can be a coalesced notification that shows data about a set of candidate events that appear to be related. In one embodiment, the method can further include removing duplicate events from the calendar database based on one or more of: duplicate times; or duplicate title; or duplicate source indicated by one or more domains. In one embodiment, duplicate events can be coalesced into a coalesced notification rather than removing them.

Another aspect described herein relates to an architecture for an extraction engine that can use different modules that are shared across different categories of events. In one embodiment, an extraction engine can perform the following operations: receiving a document from a domain, the document containing structured data such as HTML content; determining a language of the document; classifying the document as one of an event or a non-event; detecting, for an event described by the structured data, one or more of a location, an address, a date, a time, a phone number, or a uniform resource locator; selecting a data extractor, from a set of data extractors for different categories of events, based on the domain which is determined to be in one of the categories; invoking, by the selected data extractor, a set of field extractors, each of which is configured to extract data from a corresponding type of field in the structured data; extracting, by the set of field extractors, data within the fields of the structured data wherein the flow or order of extracting can be controlled by the selected data extractor; validating extracted data from the fields; generating an output of the extracted data for the event; and adding the event to a calendar automatically in response to generating the output if the validating is successful. In one embodiment, the set of data extractors includes data extractors for one or more of: a restaurant reservation; a car rental reservation; a hotel reservation; a ticketed event including sports games and shows; a flight reservation; or a social invitation event. In one embodiment, the method can further include comparing the domain to a white list of domains; if the comparison shows that the domain is not in the white list, the method can stop before classifying the document. In one embodiment, the method can further include pre-processing the document, if the document is classified as an event, to remove content not associated with the event prior to extracting data within fields of the structured data. In one embodiment, the classifying determines whether the document is a cancellation of the event. In one embodiment, each data extractor in the set of data extractors controls, when selected, a flow of data extraction by the field extractors. In one embodiment, the method can further include generating a key for the event to compare to other keys to remove duplicate events in the calendar. In one embodiment, each field extractor in the set of field extractors extracts candidates from the document and scores the candidates for a likelihood of being valid data for a field for the event. In one embodiment, the method can also include: sending a failure report to a server system if the validating is not successful, wherein the failure report includes the domain and one or more failure types. The failure reports can be used to compare successful event extractions to failed event extractions and determine whether or not event extraction software should be updated.

Another aspect described herein relates to the use of extracted events in map applications which can display maps and which can be used when traveling to a location to provide route guidance while traveling to an event. A method in one embodiment according to this aspect can include the following operations: extracting an event from structured data or text having a natural language description, the extracted event including a location; adding the extracted event to a database containing one or more extracted events; receiving a selection to display a map application; searching, in response to the selection to display the map application, the database for extracted events that include a location; displaying, within the map application, a suggested option to show the location of the extracted event. In one embodiment, the method can further include: filtering results from the searching by determining whether the location of the extracted event is within a threshold distance of a current location of the data processing system and if the location of the extracted event is within the threshold distance of the current location, the extracted event is displayed as the suggested option. In one embodiment, the method can further include: filtering results from the searching by determining whether a time of the extracted event is within a predetermined period of time of the current time, and if the time of the extracted event is within the predetermined period of time of the current time, the extracted event is displayed as the suggested option. In one embodiment, other extracted events in the database of extracted events are not displayed as suggested options if (a) the other extracted events contain no location, or (b) times of the other extracted events are not within the predetermined period of time of the current time, or (c) locations of the other extracted events are not within the threshold distance of the current location. In one embodiment, the searching can be performed while no characters have been entered into a search input field, and hence the suggested options are zero word auto completion suggestions in one embodiment for the map application.

In one embodiment, the database of extracted events has a restricted access requiring an access privilege that the map application or a destination daemon has, while other applications on the data processing system do not have the access privilege. In one embodiment, the map application can include a widget accessible from an application launching user interface. In one embodiment, the location of the extracted event can be validated, and once validated, it can be geocoded to convert an address, such as a street address, to a set of geographic coordinates such as latitude and longitude. In one embodiment, the extracted event database can include extracted events from one or more synchronizations with a cloud storage account, used by the data processing system to obtain extracted events from other devices that use the cloud storage account.

In one embodiment, the method can further include: displaying a command, within the map application's user interface, to add the extracted event to a calendar that can be displayed through a calendar application; adding the extracted event to the calendar application, and removing duplicate extracted events from at least one of the database or the calendar application. The method can further include in one embodiment: determining a transportation mode; obtaining, from one or more server systems, information about traffic or transportation delays; determining an estimated time of arrival based on the determined transportation mode and the information about traffic or transportation delays; and wherein the estimated time of arrival is displayed with the suggested option within the map application.

The methods and systems described herein can be implemented by data processing systems, such as one or more smart phones, tablet computers, desktop computers, laptop computers, smart watches, wearable devices, audio accessories, onboard computers, and other data processing systems and other consumer electronic devices. The methods and systems described herein can also be implemented by one or more data processing systems which execute executable computer program instructions, stored in one or more non-transitory machine readable media or medium that cause the one or more data processing systems to perform the one or more methods described herein when the program instructions are executed. Thus, the embodiments described herein can include methods, data processing systems, and non-transitory machine readable media such as DRAM memory and flash memory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 2A shows an example of a user interface of a messaging application which can include a natural language description of an event.

FIG. 2B shows an example of a user interface of a calendar application.

FIG. 2C shows an example of an auto completion suggestion based upon an extracted event, where the suggestion can be shown in a calendar application in response to a selection of a command to add a new event to the calendar.

FIG. 2D shows an example of a user interface of a calendar application which can accept search queries that are input into a search input field, and the search queries can be used to search extracted events in an extracted event database.

FIGS. 12A, 12B, 12C, 12D, 12E, and 12F show examples of various possible fields within six different categories of events, which include car rental reservations, ticketed events, restaurant reservations, hotel reservations, flight reservations, and social invitations.

FIGS. 13A, 13B, 13C, 13D, 13E, 13F, and 13G show examples of validation rules which can be used as part of the processing by the event extraction engine shown in FIG. 10.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
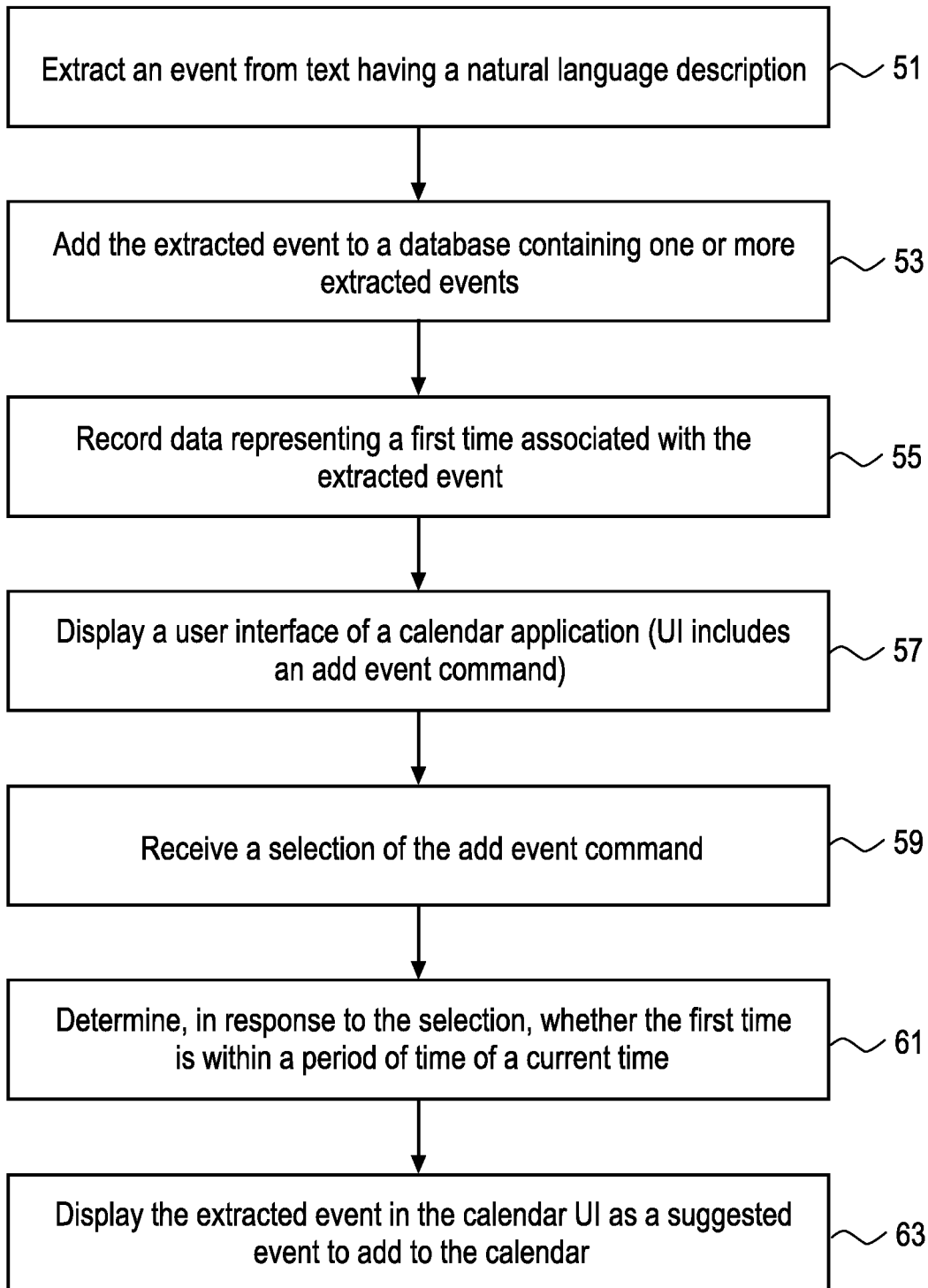
FIG. 1 is a flowchart which illustrates a method for extracting an event from a natural language description.

One aspect described herein relates to the extraction of one or more events from text having a natural language description of the one or more events. FIG. 1 shows an example of a method which uses events extracted from text having a natural language description. The method of FIG. 1 can use known data extraction techniques which extract data from natural language descriptions, where the data includes data for events. Examples for such data extraction techniques are described in U.S. Pat. Nos. 7,912,828 and 8,738,360. These known techniques can be used to perform operation 51 and can be used as part of the event extractor 251 shown in FIG. 4. Referring back to FIG. 1, in operation 51, one or more events are extracted from text that has a natural language description. FIG. 2A shows an example of a natural language description of an event displayed within a transcript 103 of a user interface of a messaging application 101. Referring back to FIG. 1, in operation 53, the extracted event can be added to a database containing one or more extracted events. Optional operation 55 can then record data representing a first time that is associated with the extracted event. This first time can be used later to determine whether or not to present the extracted event as a zero word auto completion suggestion in one embodiment. In another embodiment, the first time is not used, and the auto completion suggestion which shows extracted events can be displayed without regard to time. In operation 57, a user interface of a calendar application can be displayed, and this user interface can include a command to add an event to the calendar. An example of such a command is shown in FIG. 2B which shows a user interface of a calendar application, which includes an add event icon 121; the user can select the add event icon 121 to cause the calendar application to present a user interface, such as the user interface shown in FIG. 2C to allow the user to add a new event to the calendar. Referring back to FIG. 1, in operation 59, the user interface of the calendar application can receive a selection of the add event command. The selection may include a touch or tap on the add event icon or the use of a cursor and mouse to select the add event icon or the use of other techniques known in the art to select the add event command represented by the add event icon. Then in operation 61 shown in FIG. 1, the system determines, in response to the selection received in operation 59, whether the first time is within a period of time (e.g., one hour) of the current time; operation 61 is performed in those embodiments in which the first time is used. If the first time is within a period of time of a current time, then the extracted event is displayed as a suggested event to add to the calendar, and this is shown as operation 63 in FIG. 1. In one embodiment, the display of the extracted event can occur in response to a search of a database of extracted events (where no search query has been entered by a user), and all extracted events within a predetermined period of time (e.g., one hour) of the current time can be presented as a suggested event. In other words, in one embodiment each such suggested event is a zero word auto completion suggestion that is displayed because the first time of each such event is within a period of time of the current time. In one embodiment, the period of time can be one hour, and all such extracted events which were extracted within the last hour can be presented as a zero word auto completion suggestion of a suggested event (found by a search engine) in response to the selection of the add event command.

Figure 4:
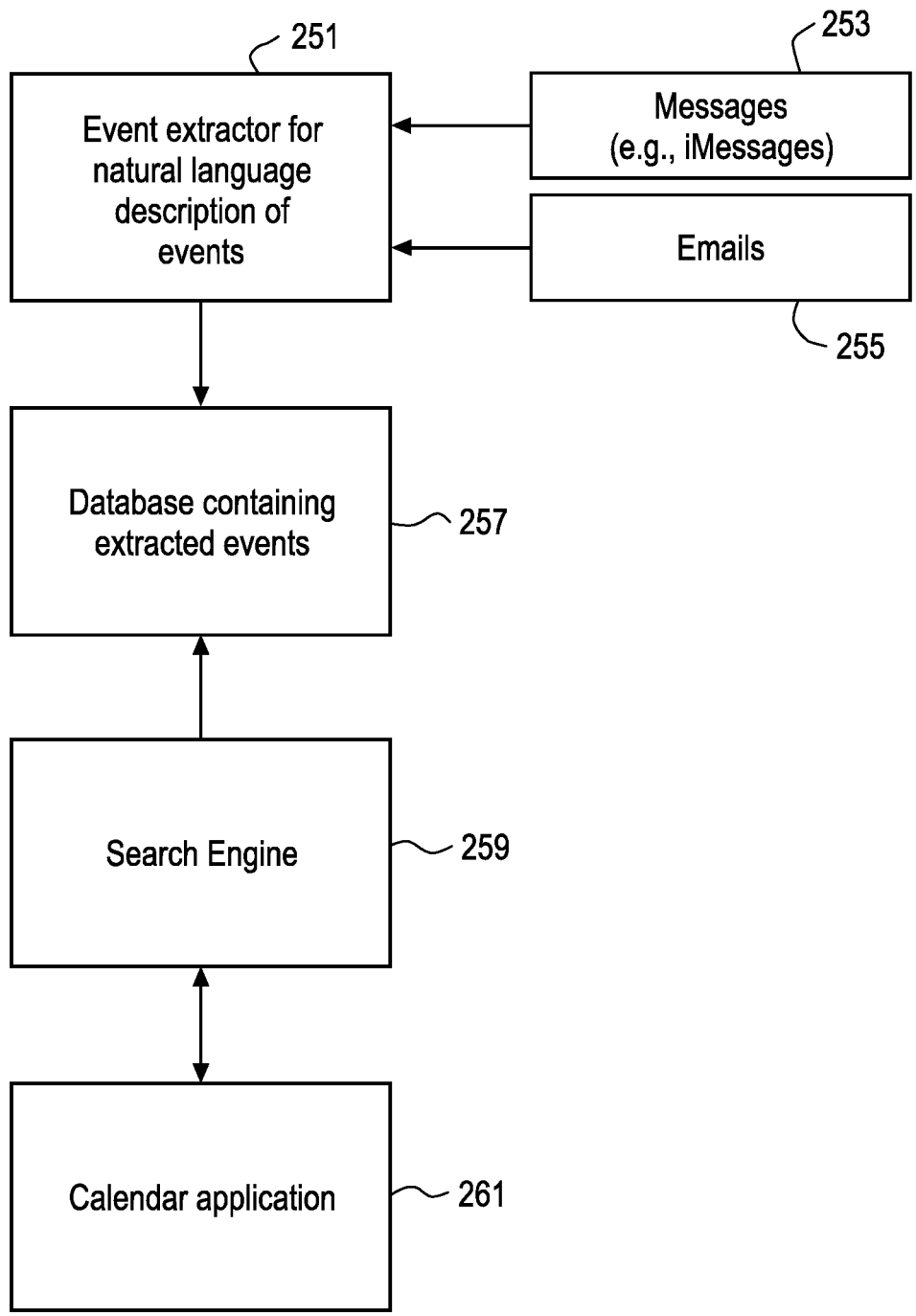
FIG. 4 shows an example in block diagram form of an architecture for using an event extractor with a calendar application.

The following example will illustrate the method of FIG. 1 by describing a text message session between two friends. Each friend can use a messaging application to exchange messages with the other friend in a conversation involving lunch. FIG. 2A shows an example on one device of that conversation. The user interface 101 of the messaging app includes a transcript 103 which shows three message bubbles 105, 107, and 109. The user interface 101 also includes an input staging area 111 and an on-screen keyboard 112. The text entered into the messaging application is analyzed by a hybrid engine leveraging machine learning algorithms (which models were trained to recognize event intents in natural language descriptions) and an event knowledge database. The event extractor 251 in FIG. 4 is an example of such an event extractor which analyzes text in a natural language description such as emails 255 and messages 253 shown in FIG. 4. The event extractor 251 can then extract events and store them within the database 257 shown in FIG. 4. Referring back to FIG. 2A, it can be seen that the two friends have agreed to have lunch at a restaurant known as Fred's. In one embodiment, the event extraction system can assume a default time for lunch, such as 12:30 pm. The event extractor can extract a title of the event, such as "lunch" and can assign a default start time and default duration, if not explicitly mentioned in the natural language description.

The extracted event, which was extracted from the natural language description, can be added to a database of extracted events, such as the database 257 which can then be searched in response to the selection of an add event icon, such as the add event icon 121 within the user interface 120 of the calendar app shown in FIG. 2B. In other words, either user who participated in the messaging conversation shown in FIG. 2A can go to their calendar application to bring up the user interface 120 and can select the add event icon 121. In response to the selection of the add event icon, a search of the extracted events database can be automatically performed to retrieve all recent events within a period of time, such as one hour of the current time with no search query having been entered by the user. This search can be performed without selecting the search icon 122 within the user interface 120 of the calendar application shown in FIG. 2B. In other words, the search performed in response to the selection of the add event icon 121 is automatically performed in response to the selection of the add event icon and does not require a separate selection of the search icon 122. The result of the search in response to the selection of the add event icon 121 is shown in FIG. 2C, which represents a zero word auto completion suggestion (from the search by the search engine) of extracted events which have been extracted within the past hour (in this embodiment) of the current time. The period of time used in operation 61 in one embodiment is one hour but could be other periods of time. As shown in FIG. 2C, the extracted event 133 can be an auto completion suggestion returned as part of the search results where no characters have been entered into a search input field of the calendar application. The extracted event 133 shows that the event is considered a candidate event by the word "maybe" and includes the name of the restaurant and a time and an invitee who is the other participant in the text messaging session shown in FIG. 2A. If the user who was operating the messaging app shown in FIG. 2A has conducted other messaging conversations within the past hour, and those other message conversations also created extracted events, then the auto completion suggestion (from the search engine 259) of extracted events shown in FIG. 2C would also include those extracted events because those were also extracted within the past hour in one embodiment.

The time-based approach shown in FIG. 1 allows a user to retrieve, without entering any characters in a search input field, all recently extracted events which have been extracted from recent messages, emails, etc. and other natural language descriptions that have been processed by the system automatically. Thus, the user need not enter any search query to retrieve recent extracted events such as those events which have been extracted in the last hour in one embodiment. It will be appreciated that other time periods other than one hour can also be used in alternative embodiments. In one embodiment, the first time which is associated with the extracted event can be a time of receipt of the text message or email that provides the natural language description of the extracted event; alternatively, the first time can be a time that the extracted event was extracted when the text message or email was displayed; alternatively, the first time can be the time that the extracted event was added to the database of extracted events. In each case, the first time is compared to the current time to determine whether it is within a period of time of the current time, such as within one hour of the current time. In one embodiment, the event extractor (such as event extractor 251) can extract an expiration date or create an expiration date based on rules about expiration and the text description; for example, a lunch or restaurant reservation can be, by default, treated as expired on the day after the start date, so if the start date is Wednesday, August 17th, the expiration date can be, by default, Thursday, August 18th. The expiration date, in one embodiment, can be used to remove one or more extracted events that are expired; in one embodiment, all extracted events that are expired can be removed periodically from the extracted events database so that the search engine (e.g., search engine 259) does not return stale extracted events in the search results. The removal of expired extracted events can also be performed in the other embodiments described herein, such as embodiments that extract events from structured data (e.g., HTML content in web pages or emails in the embodiment shown in FIGS. 7, 10, and 16).

As shown in FIG. 2D, the embodiments described herein can also allow a user to search for extracted events by entering one or more characters into the search input field 137 which is displayed within the user interface 120B of the calendar application. The entry of one or more characters into the search input field 137 can cause the search engine 259 shown in FIG. 4 to search the database containing extracted events, which is shown as the database 257 in FIG. 4. The results of that search can be provided by the search engine 259 to the calendar application 263 which can present the user interface as shown in FIGS. 2B, 2C, and 2D.

Figure 2E:
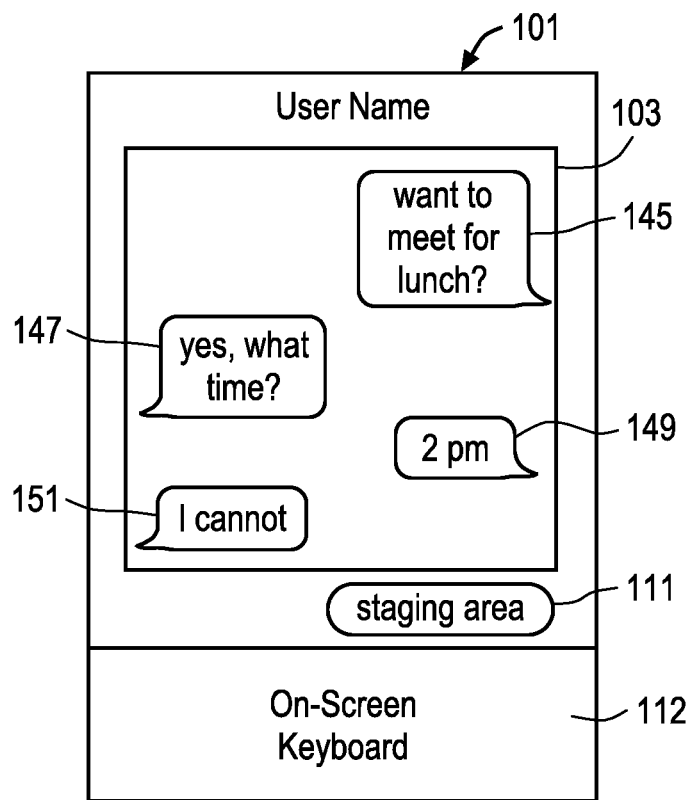
FIG. 2E shows an example of a user interface of a messaging application which displays a natural language description of a cancellation of an event.

In one embodiment, the event extractor 251 shown in FIG. 4 can analyze the natural language description to determine whether an event has been canceled. This can occur either before the event is added to the database of extracted events, such as database 257, or after the events are added to the database of extracted events. The detection of a cancellation can cause the event extractor, such as the event extractor 251, to remove an extracted event from the database of extracted events such as the database 257 shown in FIG. 4. FIG. 2E shows an example of a conversation containing four message bubbles 145, 147, 149, and 151. Message bubbles 145, 147, and 149 suggest that an event (lunch) has been scheduled. However, message bubble 151 shows that the event is canceled because one of the participants cannot make the event and this can cause the event extractor, such as event extractor 251, to cancel the event which can cause the event to be removed from the database of extracted events if it has already been added to that database.

Figure 3A:
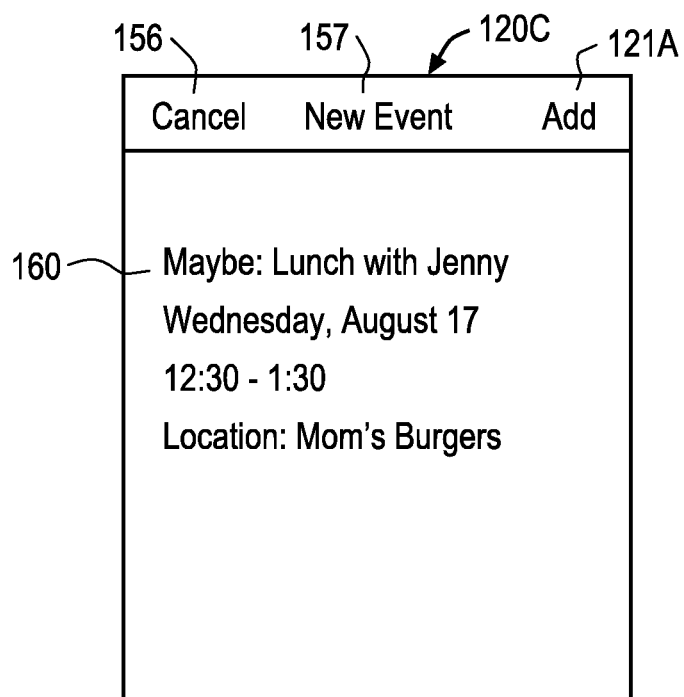
FIG. 3A shows an example of a user interface of a calendar application which displays a suggested event which was obtained through a search through an extracted event database.
Figure 3B:
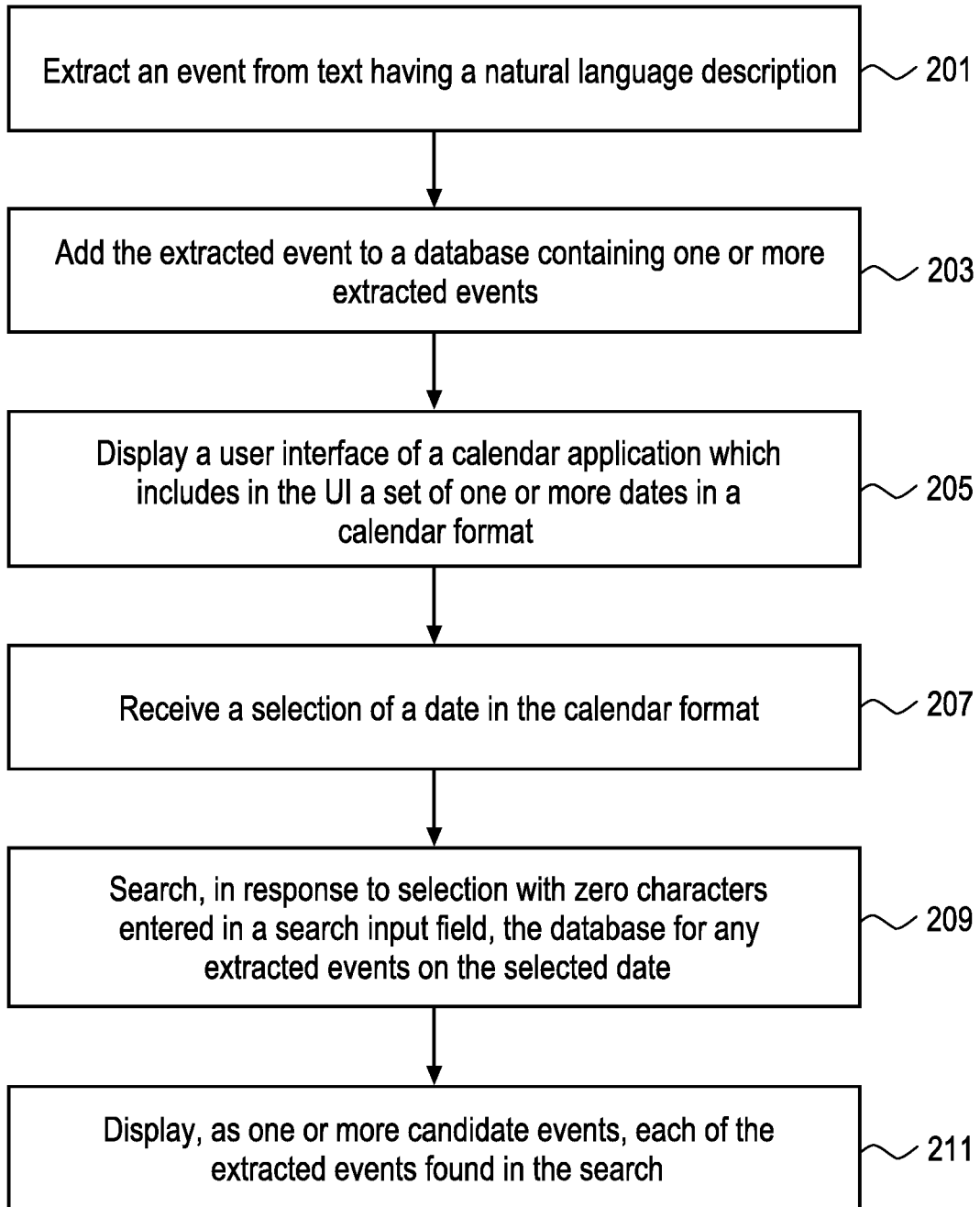
FIG. 3B shows a method according to one embodiment for displaying one or more candidate events in response to the selection of a date in a calendar or in response to the selection of a command to add a new event to the calendar.

FIGS. 3A and 3B show another embodiment in which extracted events can be returned as search results which can be auto completion suggestions provided in the search results. The method shown in FIG. 3B can begin in operation 201 which extracts an event from text having a natural language description. For example, operation 201 can use the event extractor 251 to extract an event from a natural language description such as descriptions found in messages 253 or emails 255 shown in FIG. 4. In operation 203 of FIG. 3B, the extracted events can then be added to a database containing one or more extracted events. This can be seen in FIG. 4 where the event extractor 251 adds extracted events to the database 257. Referring back to FIG. 3B, a user can select or launch a calendar application which, in operation 205, displays the user interface of a calendar application which can include various different ways of showing views of a calendar (such as daily view, weekly view, monthly view, etc.). In one embodiment, the view can be a calendar format which shows one or more dates, such as the format shown in FIG. 2B, which shows calendar entries 125, 127, and 129 in a weekly view 123. Then in operation 207 of FIG. 3B, the data processing system can receive a selection of a date in the calendar format that is displayed within the user interface of the calendar application. For example, the user can select the date shown in calendar entry 127 in FIG. 2B. The selection in operation 207 of FIG. 3B can then cause operation 209 to occur. In operation 209, the data processing system can search, in response to the selection of the date with zero characters entered into a search input field, the database for any extracted events on the selected date. Referring to FIG. 4, the search engine 259 can search the database 257 for extracted events on the selected date, and the results of that search can include one or more extracted events, which can be displayed in operation 211 in FIG. 3B as one or more candidate events. FIG. 3A shows an example of a user interface 120C of the calendar application which can result from operation 211 in FIG. 3B. In this example shown in FIG. 3A, an extracted event 160 has been found by the search in operation 209 of FIG. 3B and is displayed in the user interface 120C. The candidate event is shown as a candidate by the word "maybe" in the extracted event 160 as shown in FIG. 3A. The extracted event may have been created as a result of an email or text message between the user of the data processing system and another user which have exchanged text in a natural language description, which describes a lunch at a restaurant known as Mom's Burgers on the date that was selected in operation 207 of FIG. 3B. If there were multiple extracted events on the selected date, the calendar user interface, such as user interface 120C can display multiple extracted events in a scrollable list. The user of the data processing system which includes the calendar app can then add the extracted event to the user's calendar by selecting the add event option 121A or can not add the extracted event to the user's calendar by selecting the cancel option 156. The user interface 120C also allows the user to add a new event by selecting the new event option 157, which new event would normally be different than the extracted event 160. In the method of FIG. 3B, the user was not required to enter any characters into the search input field (such as search input field 137 in the user interface of a calendar application), and hence the search results provided by the search engine can be considered a zero word auto completion suggestion or set of suggestions which are based upon the selected date which was received in operation 207. It will be appreciated that the user could also search for extracted events by entering characters into the search input field in the calendar application to retrieve calendar events that were manually entered by the user as well as extracted events in a database of extracted events, such as the database 257. The search engine, such as search engine 259 shown in FIG. 4, can then return results to the calendar application 261 based upon the characters entered by the user into the search input field.

In an alternative embodiment of the method shown in FIG. 3B, operation 207 can receive a selection to add a new event rather than a selection of a date in the calendar application. For example, the user can select the add event icon 121 shown in FIG. 2B in this alternative embodiment of operation 207 shown in FIG. 3B. This can cause an alternative embodiment of operation 209 in which the search engine searches the database of extracted events without regard to date and returns, as search results, extracted events which are found in the search. This search in the alternative embodiment of operation 209 can be performed with zero characters having been entered by the user into the search input field of the calendar application, and the user can further limit the search results by entering characters into the search input field to reduce the displayed number of candidate events in the search results.

Figure 5:
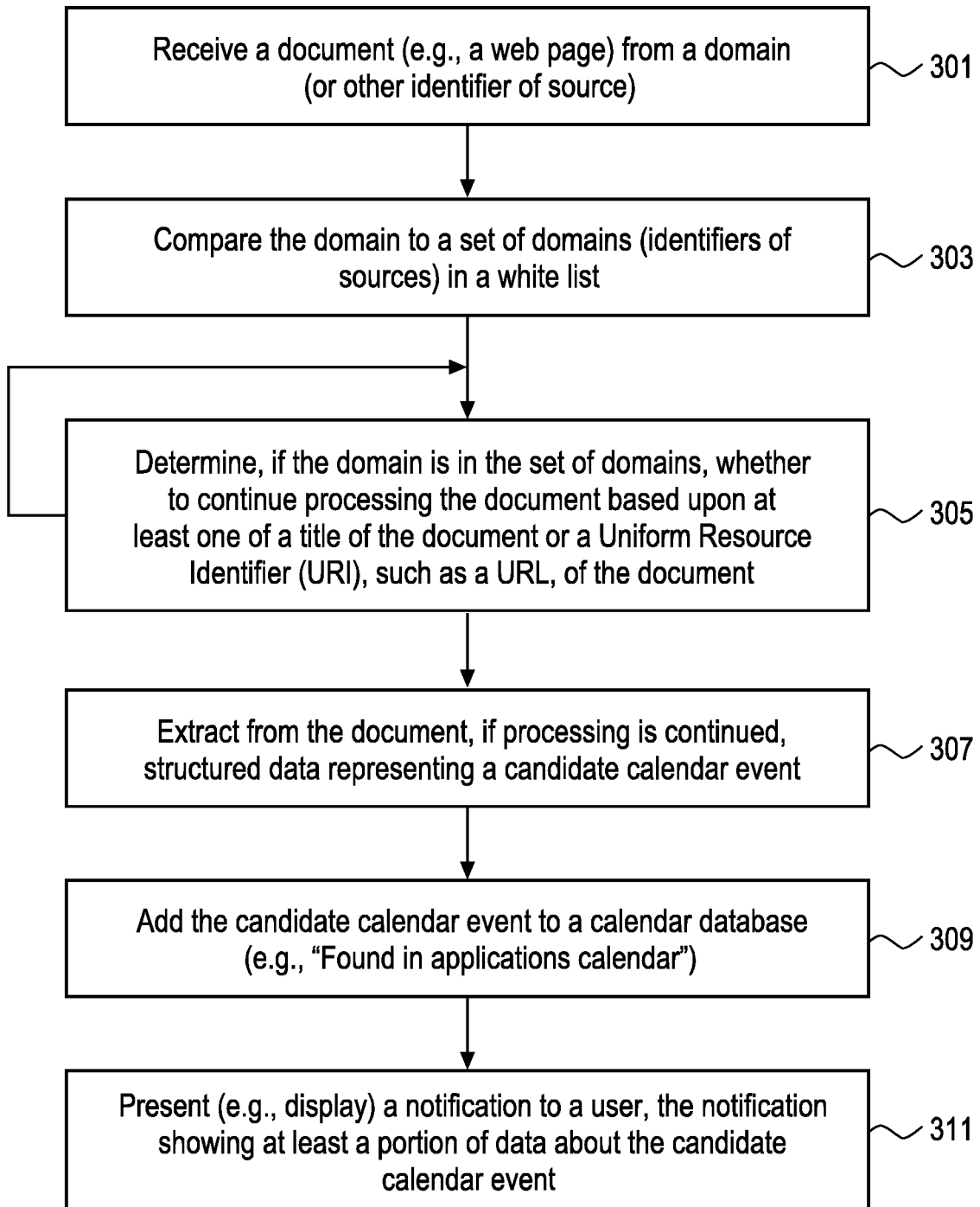
FIG. 5 is a flowchart which illustrates a method according to one embodiment in which one or more events can be extracted from structured data such as a web page.
Figures 6A, 6B, 6C:
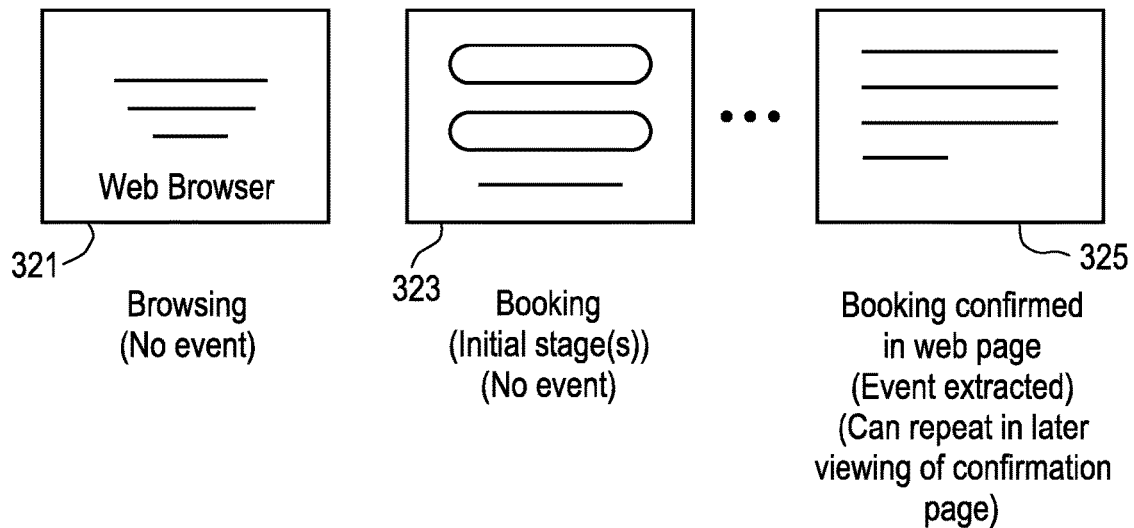
FIGS. 6A, 6B, and 6C show examples of web pages in a web browser during a browsing session while a user browses through multiple web pages within a domain and a classifier determines, for each such page during the browsing session, whether or not to extract an event during the browsing session.
Figure 7:
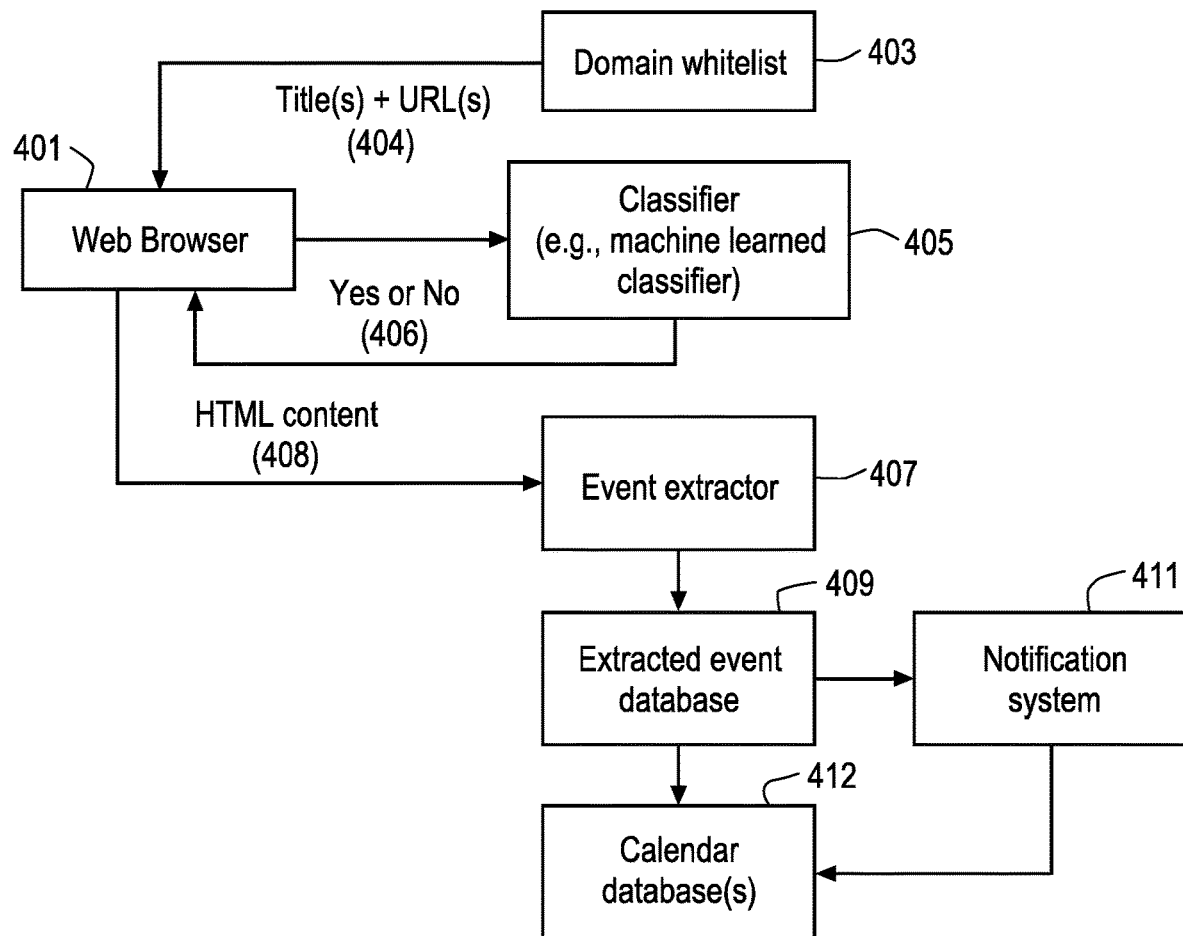
FIG. 7 is a block diagram of a software architecture which can be used to perform the method shown in FIG. 5.

FIGS. 5, 6A, 6B, 6C, 7, and 8A through 8D show another aspect of the embodiments herein which can be used when processing structured data such as web pages that contain HTML content. Embodiments according to this aspect can use the method shown in FIG. 5 with the architecture shown in FIG. 7, which can ultimately produce a set of one or more notifications, such as the notifications shown in FIGS. 8A, 8B, 8C, and 8D. Referring to FIG. 5, in operation 301, a document, such as a web page, is received from a domain or other identifier of the source of the document. In operation 303, the domain can be compared to a set of domains (or other identifiers of sources) in a white list such as the domain white list 403 shown in FIG. 7. If the domain is not found in the white list, method 5 can stop at operation 303 and does not continue as long as the web browser remains browsing in that domain. In one embodiment, the white list is a data structure in a memory mapped trie, and the comparison operation performed in operation 303 of FIG. 5 can be a lookup operation in the memory mapped trie. If the domain of the document received in operation 301 is found in the white list in operation 303, then processing continues to operation 305 shown in FIG. 5. Operation 305, in one embodiment, can be performed in a loop repeatedly by the classifier 405 shown in FIG. 7 as a user browses through multiple web pages within the same domain, such as the web pages 321, 323, and 325 shown respectively in FIGS. 6A, 6B, and 6C. In one embodiment, the browsing through multiple web pages within the same domain can occur when a user is booking a registration for a flight or a restaurant or a movie or other event categories, where the booking process requires that the user interact with multiple web pages in the domain. Referring back to FIG. 5, operation 305 determines whether to continue processing the document based upon (in one embodiment) at least one of a title of the document or a uniform resource identifier, such as a URL (uniform resource locator) of the document. Operation 305 can be seen in FIG. 7, in which the web browser 401 provides the title and URL 404 to the classifier 405 which performs operation 305 shown in FIG. 5. As the user browses through multiple web pages within the domain, operation 305 is repeated for each web page, and the web browser 401 shown in FIG. 7 repeatedly provides one or more titles and URL 404 to the classifier 405 which then can indicate whether or not, in decision 406, to extract the event in the web page. The decision 406 can indicate when to extract based upon the classification of the web page provided by the classifier 405. In a typical example of the loop that operation 305 in FIG. 5 can perform, the classifier can return the no decision 406 for an initial set of web pages prior to one or more final set of web pages when the classifier provides the yes decision 406 back to the web browser 401. This can be seen in FIGS. 6A, 6B, and 6C. In particular, the initial web page 321 is classified as a non-event by the classifier 405. Similarly, during the initial stages of the booking process, the classifier 405 classifies web page 323 as a non-event. This can continue through multiple web pages within the domain. At each instance of a new web page, the web browser 401 in FIG. 7 provides title and URL 404 to the classifier 405 which then classifies the web page with either a yes decision (it is an event) or a no decision (it is a non-event, do not extract yet). In the example shown in FIG. 6C, the web page 325 can be a web page showing that the booking of an event has been confirmed, and the classifier 405 returns a yes decision 406 to the web browser 401 in FIG. 7, which then provides the HTML content 408 to an event extractor 407 shown in FIG. 7. Referring back to FIG. 5, the decision by the classifier 405 causes processing to continue from operation 305 to operation 307 in which structured data from the particular web page classified as an event by classifier 405 is extracted. The structured data represents a candidate calendar event. After the structured data has been extracted in operation 307 by, for example, the event extractor 407 in FIG. 7, operation 309 in FIG. 5 can be performed. In operation 309, the candidate calendar event can be added to a calendar database which can be a database for a sub-calendar, such as the sub-calendars described in published U.S. application number 2004/0109025. For example, as shown in operation 309 the candidate calendar event can be added to a calendar which is characterized as a "found in applications calendar". This calendar database can be part of the extracted event database 409 shown in FIG. 7. The addition of the candidate calendar event can then cause a notification system, such as notification system 411 shown in FIG. 7, to cause operation 311 shown in FIG. 5. In operation 311, the data processing system can present a notification to a user, and the notification can show at least a portion of the data about the candidate event which was extracted in operation 307 of FIG. 5. Referring back to FIG. 7, the notification system 411 can cause the display of notifications, such as the notifications shown in FIGS. 8A, 8B, 8C, and 8D, and the user can interact with those notifications to cause the extracted events to be added to one or more calendar databases 412 shown in FIG. 7.

Figure 8A:
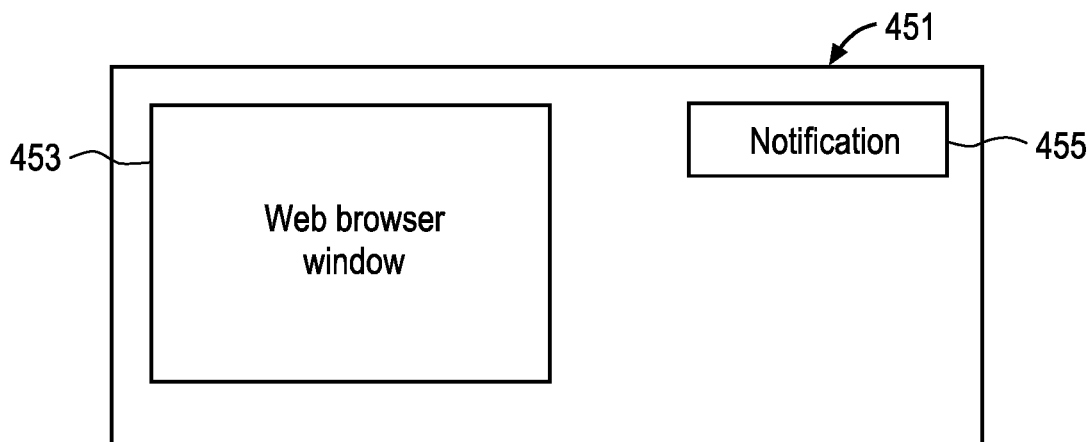
FIGS. 8A, 8B, 8C, and 8D show examples of notifications which can be used, for example, in conjunction with the method shown in FIG. 5.
Figure 8B:
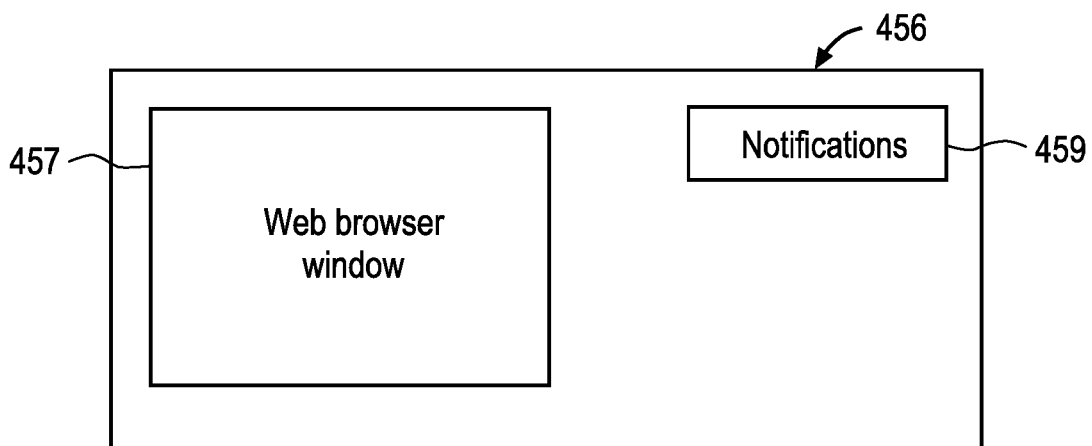
Figure 8C:
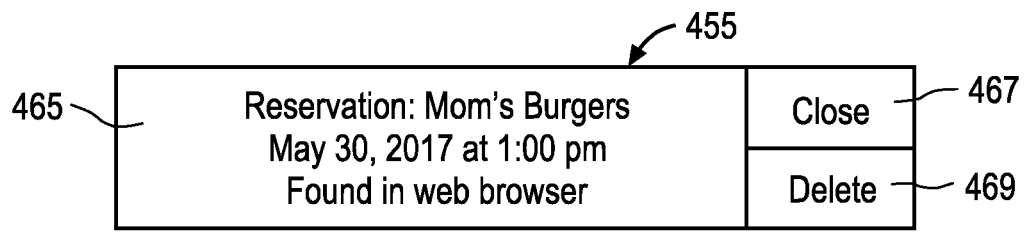
Figure 8D:
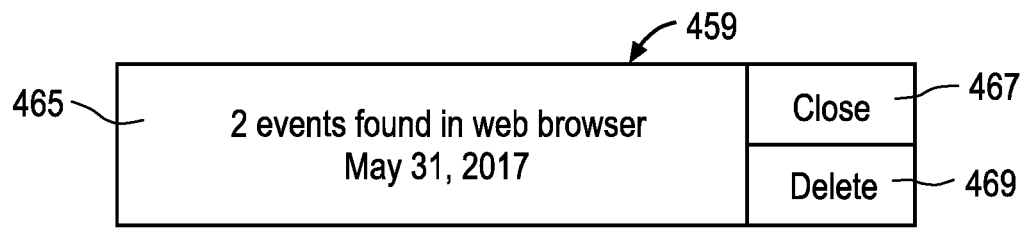

In one embodiment, the notifications can be displayed to a user contemporaneously with the completion of the booking process, and this is shown in both FIGS. 8A and 8B. In the case of FIG. 8A, the web browser window 453 is still displayed on the screen 451 of the user's data processing system when the notification 455 is displayed. The web browser window 453 can display the final page of the booking process which can be a confirmation page providing the details which are extracted by the event extractor 407 shown in FIG. 7. Thus, in one embodiment, the notification 455 can appear soon after the confirmation web page (such as web page 325 shown in FIG. 6C) is displayed after the event extractor has extracted the event and added the extracted event to the extracted event database, such as database 409 shown in FIG. 7. In the case of the user interface shown in FIG. 8B, the web browser window 457 is displayed on the screen 456 and multiple notifications 459 are displayed at the same time based upon a plurality of extracted events which have been extracted from a booking, such as a car rental reservation or a flight reservation. FIG. 8C shows an example of the notification 455 which includes at least a portion of data about the candidate calendar event in region 465 and also includes a close option 467 and a delete option 469. The user can select the region 465 which can cause the calendar application to open to allow editing an entry of the event into the user's calendar. If the user selects the close option 467, the notification is closed without adding the extracted event into the user's calendar; however, the extracted event can remain in the extracted event database, such as extracted event database 409, until its expiration date which can be stored in a field as part of the data about the particular extracted event. If the user selects the delete option 469, the extracted event can be not added to the user's calendar and also can be deleted from the extracted event database, such as extracted event database 409 shown in FIG. 7. FIG. 8D shows an example of the user interface of multiple notifications, such as the multiple notifications 459.

In one embodiment, the classifier 405 shown in FIG. 7 can be a machine learned classifier that is trained on manually labeled examples of web pages that are used to learn, based on characteristics of a title of a web page or a subject line of an email whether the email or web page is a confirmation of a reservation or an advertisement or promotion which is not an event. In one embodiment the events which are extracted by the event extractor, such as event extractor 407, can be added to a private local calendar database which is separate from the user's main calendar. If the private local calendar database is stored in the user's private storage cloud account then it can be encrypted. In one embodiment, the private local calendar database that contains extracted events can be displayed in a sub-calendar that is one of several sub-calendars displayable in a calendar application. In one embodiment, notifications which appear to be for the same event can be coalesced into a single notification which can be shown as notifications 459 in FIGS. 8B and 8D. In one embodiment, an identifier of an event, such as a key described below, can be created in order to identify events which are duplicate events to allow the removal of a duplicate event from the calendar and calendar database.

Figure 9:
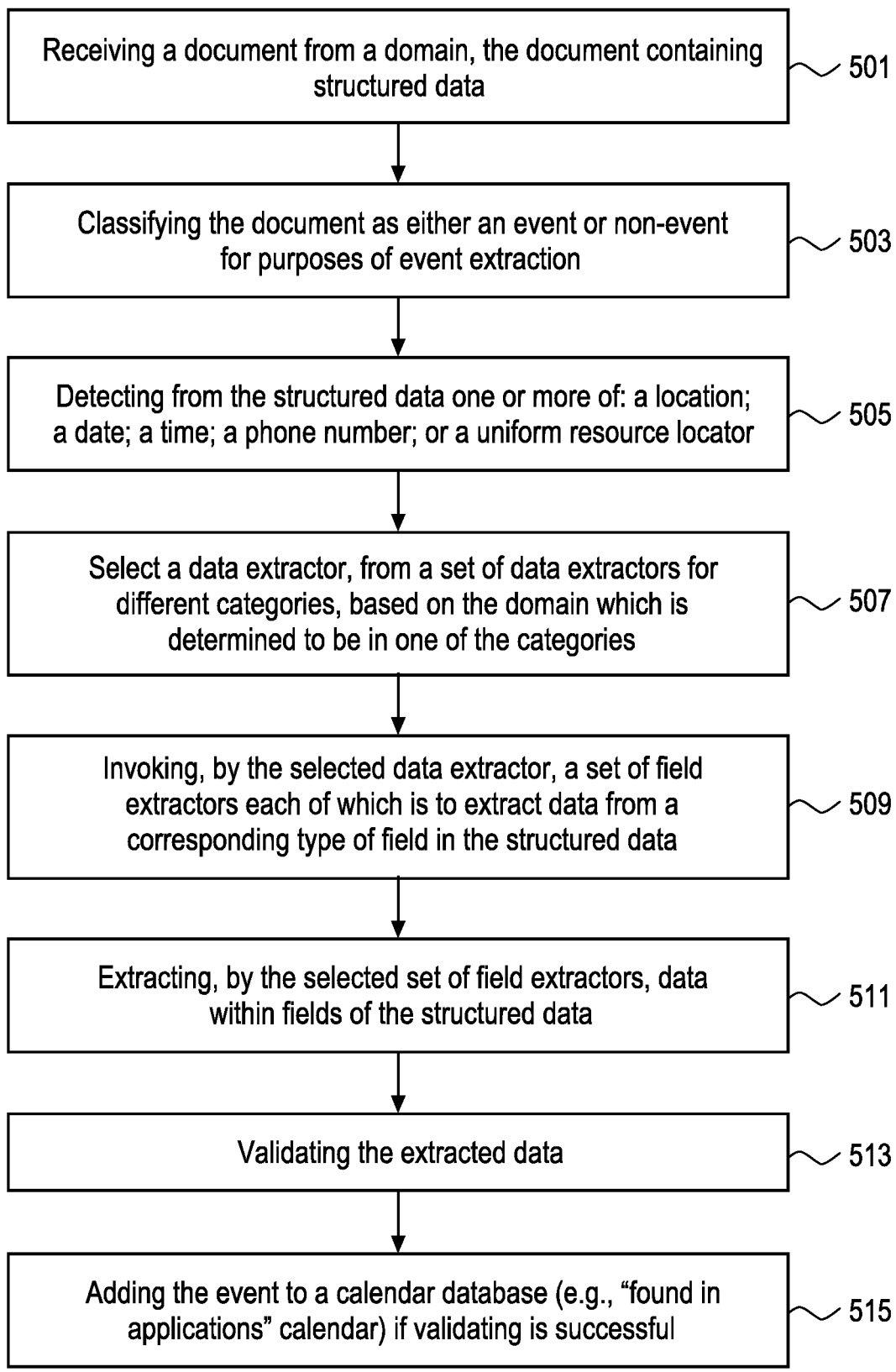
FIG. 9 is a flowchart which shows a method of using an extraction engine that uses a hierarchy of components.
Figure 10:
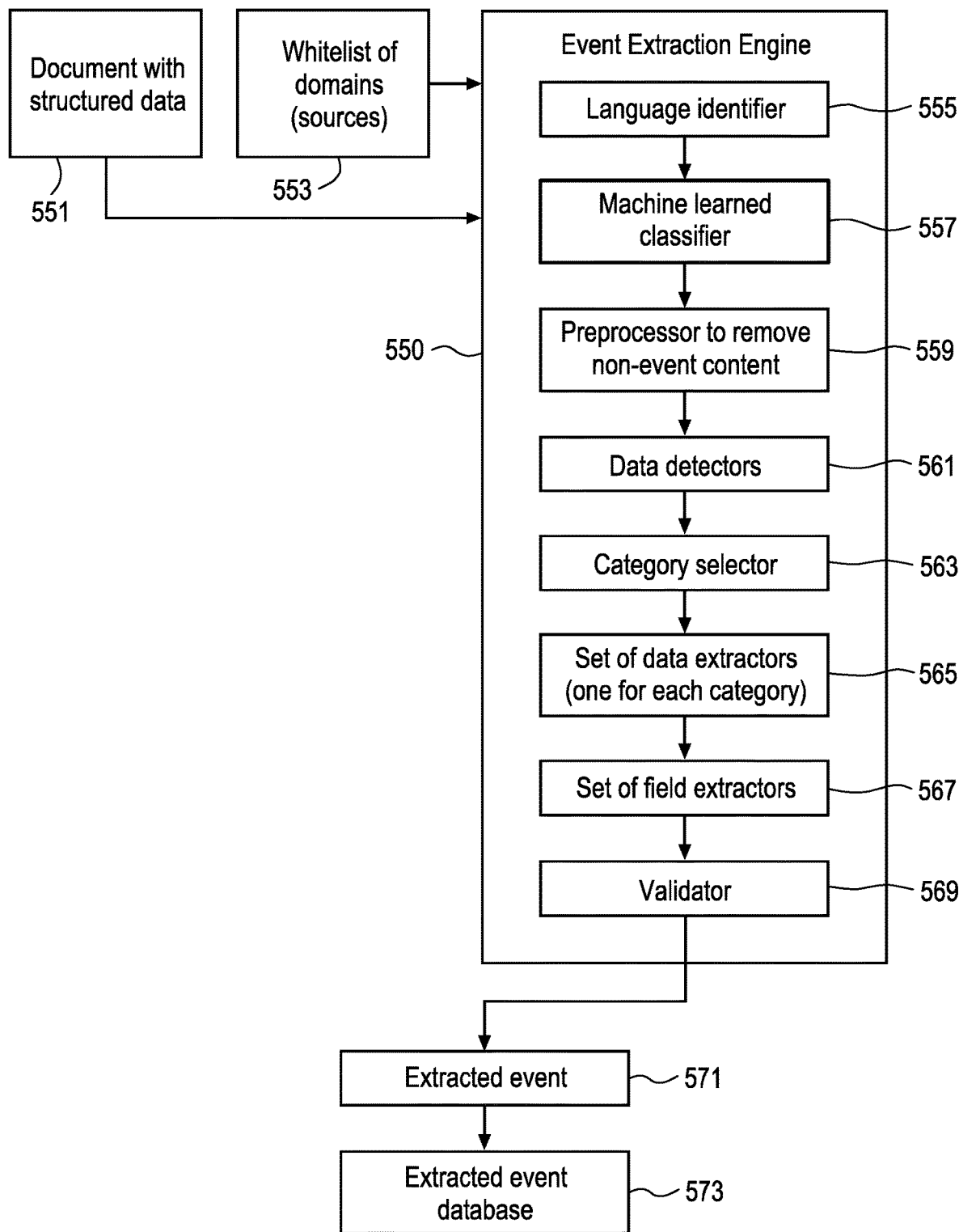
FIG. 10 shows an example of an event extraction engine according to one embodiment.
Figure 11:
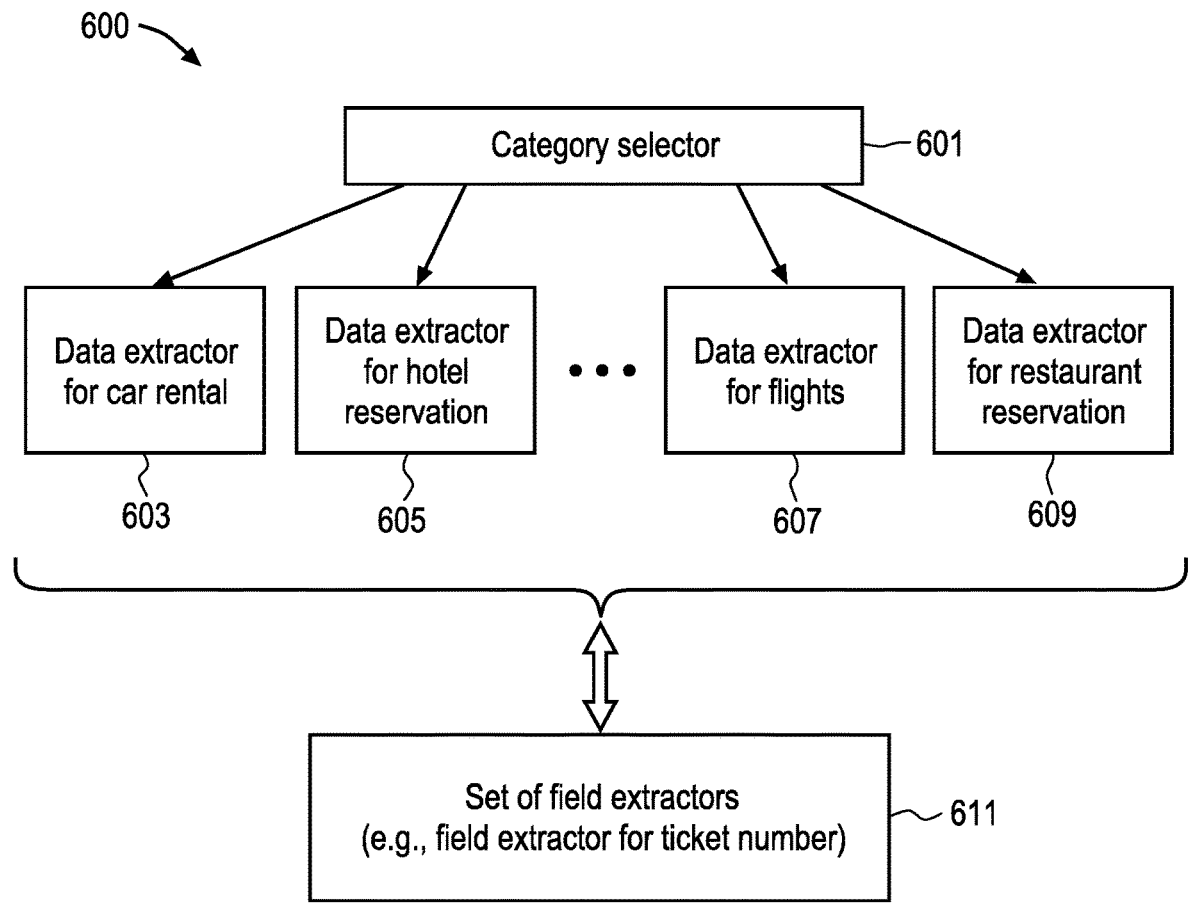
FIG. 11 shows an example of a hierarchy which can be used to implement the event extraction engine shown in FIG. 10.

Another aspect of the embodiments described herein relates to an event extraction engine that can use a hierarchy of components, and within that hierarchy there can be multiple data extractors with each of the multiple data extractors dedicated to a particular category of events such as hotel reservations, car rental reservations, flight reservations, restaurant reservations, ticketed events, etc. FIGS. 9, 10, and 11 show an example of this aspect. Also, the event extraction engine described in this aspect (e.g., event extraction engine 550) can be used in other aspects, such as in the event extractor 407 and the extraction system 755. In one embodiment, the event extraction engine 550 shown in FIG. 10 can perform the method shown in FIG. 9, and the event extraction engine 550 can use the hierarchy 600 shown in FIG. 11 to perform the event extraction process. The method shown in FIG. 9 can begin in operation 501 in which a document is received from a domain, and the document contains structured data such as HTML content. The document can be, for example, a web page or an email with structured data or a text message with structured data provided by, for example, an extension app that operates with the messaging application. Referring to FIG. 10, the document 551 is an example of a document received in operation 501 of FIG. 9. In one embodiment, the method of FIG. 9 can optionally use a white list of domains such as the white list of domains (or other identifiers of source) 553 shown in FIG. 10. In one embodiment, the optional use of the white list can be performed prior to operation 503 of FIG. 9. If the domain is not found in the white list, the method of FIG. 9 can stop at that point and proceed no further for the current document. On the other hand, if the domain for the received document is found on the white list, such as white list 553 in FIG. 10, then processing can continue in operation 503. As shown by operation 503 in FIG. 9, a classifier can classify the document as either an event or non-event for purposes of event extraction. In one embodiment, the structured data within the document can be provided to the machine learned classifier 557 shown in FIG. 10, which can be similar to the classifier 405 shown in FIG. 7. In one embodiment, the machine learned classifier 557 can be a classifier that is trained manually on labeled examples that are used to learn how to classify an email or web page containing structured data, and the classification can include classifying the structured data as a confirmation of a reservation or other event and can also include classifications of non-events such as advertisements and promotions, etc. In one embodiment, the machine learned classifier can learn what the characteristics are of a subject line for confirmation emails versus an advertising email. For instance, the machine learned classifier can learn when the word "confirmation" is present in the subject line or title, this increases the likelihood that the email or web page has an event confirmation. Conversely, the machine learned classifier can learn that when the words "10% off" are present in the subject line or title of the web page, the email or web page is not likely to contain an event reservation but is just likely to be a commercial email or advertising that should be discarded. For web pages, the classifier can use the web page's title and full URL for classification. In one embodiment, the classifier can also use statistical methods to determine the locale (language and country) of the email or web page. The determination of the language can also be performed by a conventional language identifier 555 shown in FIG. 10 which provides an identification of the language in one embodiment to the machine learned classifier 557 shown in FIG. 10. This can allow the machine learned classifier to use appropriate rules for a particular language in one embodiment. In one embodiment, the machine learned classifier 557 can receive the subject line and email headers of emails when the document is an email containing structured data. If the classifier, such as machine learned classifier 557 classifies the document as an event, then processing can continue at operation 505 of FIG. 9. Operation 505 can include detecting from the structured data one or more of: a location, a date, a time, a phone number, an address, or a uniform resource locator or uniform resource identifier. This detection which can occur in operation 505 can be performed by the data detectors 561 shown in FIG. 10. In one embodiment, the data detectors 561 can be a set of known data detectors for detecting different types of data, such as location, date, time, phone number, address, uniform resource locator, etc. In one embodiment, each data detector in the set of data detectors can be dedicated to detecting only one of certain types of structured data such as a location, a date, a time, etc. In one embodiment, the data detectors 561 may perform operation 505 after an optional preprocessor, such as preprocessor 559, is used to preprocess the structured data to remove non-event content. This is shown in FIG. 10 because the preprocessor 559 precedes the data detectors 561 in the data flow shown within the event extraction engine 550. In one embodiment, the preprocessor 559 strips away irrelevant HTML annotations. For instance, the preprocessor 559 converts "<b> hello </b>" into "hello" and converts "<a href="http://apple.com" alt="apple">" into "<http://apple.com>", etc.

After detecting data from the structured data of the document in operation 505, processing can proceed to operation 507 in FIG. 9. In operation 507, the event extraction engine can, through a category selector such as category selector 563 shown in FIG. 10, select a particular data extractor from a set of data extractors for the different categories of events. This selection can be made based upon the domain which is determined to be in one of the categories. For example, if the email is received from "OpenTable.com" or the domain of the web page is "OpenTable.com" then the category selector 563 would select the data extractor for restaurant reservations, such as the data extractor for restaurant reservation 609 shown in FIG. 11. In one embodiment, the category selector 563 shown in FIG. 10 can select one of the data extractors shown in FIG. 11 such as data extractors 603, 605, 607, and 609. In one embodiment, there can be six such data extractors which are selected by the category selector 563 shown in FIG. 10. These six categories are shown in FIGS. 12A, 12B, 12C, 12D, 12E, and 12F. In one embodiment, the category selector 563 can use a data structure that includes a list of domains in each of the six categories. The category selector 563 can perform a look-up in the list of the domains and determine the category from the category specified for the domain. For example, there can be a list of domains for car rental reservations, a list of domains for restaurant reservations, a list of domains for flight reservations, a list of domains for hotel reservations, a list of domains for ticketed events, etc. In one embodiment, there is a separate data extractor for each such category and the set of such data extractors is shown as the set of data extractors 565 in FIG. 10. The role of each data extractor is to control the general flow for the category. For instance, the restaurant data extractor will attempt to extract the date and time of the event and a location if available, and then it can call into specialized reusable submodules or field extractors which work on a very specific type of extraction within a particular field. This is shown in operation 509 in which the selected data extractor invokes a set of field extractors for each field which is expected to be extracted for the category of the event. The set of field extractors can be field extractors 567 shown in FIG. 10 or the set of field extractors 611 shown in FIG. 11. In one embodiment, for each field shown in FIGS. 12A through 12F, there is a separate and distinct field extractor for the particular field, although these can be shared across the different categories. For example, a field extractor for the "start date" field can be shared for both the ticketed events category and the restaurant reservations category and the hotel reservations category and the flights reservation category, etc.

Referring back to FIG. 9, the set of field extractors which was invoked by the selected data extractor can extract, in operation 511, data within the fields of the structured data. The selected data extractor delegates the extraction of all of the necessary properties of an event in its category and then pieces together these details to create an event which can be validated in operation 513 shown in FIG. 9 by the validator 569 shown in FIG. 10. In one embodiment, the submodules or field extractors can collect a set of candidates for data extraction in the document and score them with various criteria in order to retain only the highest scored item as the extracted data for the particular field. For example, the start time field extractor can fetch all time candidates extracted using the data detectors 561 and give higher scores to candidates that are in close proximity to keywords like "start time" or "your reservation is at" or "begins at", etc. After the selected data extractor assembles the extracted event, the data can be validated using, for example the validation rules for the particular category (as well as all categories in the case of FIG. 13A) shown in FIGS. 13B, 13C, 13D, 13E, 13F, and 13G. For example, if the category selector, such as category selector 563 in FIG. 10 or category selector 601 in FIG. 11 selected the category of restaurant reservation, then the validation rules would include the rules shown in FIG. 13A and FIG. 13D in one embodiment. It will be appreciated that various alternatives exist for the validation rules, so alternative validation rules could be used in alternative embodiments which may have fewer rules or more rules or different rules in the various categories. Referring back to FIG. 9, in one embodiment, after completing successfully the validation operation (in operation 513) then the event can be added to a calendar database such as a "found in applications" calendar. In one embodiment, the extracted data, prior to adding the extracted event into a database of extracted events, can be processed to generate a formatted output which can be a dictionary representation of the event such as an event reservation that can comply with, for example, event details using the schema.org web standard for the various categories. In other words, a standard for formatting a particular type of event can be used to generate a formatted output according to that standard. Moreover the process of generating the output in a particular format can also include generating a title for the event and metadata about the event such as a duration of the event where the duration is a default duration if the duration is not supplied by the event. In one embodiment, a default duration for the event can be inferred when it is not explicit; for example, the default duration for a restaurant reservation is 1½ hours. The process of generating the output for the extracted event can also include generating a duplicate key that is used to check whether a similar event already exists in the user's calendar, and this duplicate key can be used to de-duplicate the calendar when duplicate events have been entered into the calendar. The duplicate key can be, for example, in the case of a restaurant reservation, a key such as restaurant/reservation identifier/name/time. This key can also be used when a cancellation of the event is extracted so that the cancellation can be used to remove the canceled event. Once the event is extracted (such as extracted event 571 shown in FIG. 10), it can be added to an extracted event database, such as the extracted event database 573 shown in FIG. 10. In one embodiment, the addition of the extracted event into the extracted event database can automatically populate the "found in applications" calendar with the extracted event so that the extracted event can be found by a search engine which can either be invoked by the user to search for events within a calendar application or invoked by the system in response to an event such as the user selecting an add event command within the calendar application.

As described herein, the event extraction engine 550 can employ a hierarchy of components, such as the hierarchy 600 shown in FIG. 11. The category selector 601 is at the top of the hierarchy and is responsible for selecting the particular data extractor for the particular category that is selected by the category selector. In one embodiment the category selector 601, which can be similar to the category selector 563 in FIG. 10, can select the category based upon the domain that was the source of the document, such as document 551. The category selector 601 can then select a particular data extractor which is designed to work with the selected category. In turn, the selected data extractor, which can be one of the data extractors 603, 605, 607, and 609 shown in FIG. 11 as well as other data extractors can invoke the appropriate set of field extractors within the set of field extractors 611 depending upon the particular category. FIGS. 12A, 12B, 12C, 12D, 12E, and 12F show the various field extractors for the different categories in one embodiment. The selected data extractor would pick the appropriate field extractors depending upon the category to process the data as described herein.

Figure 14A:
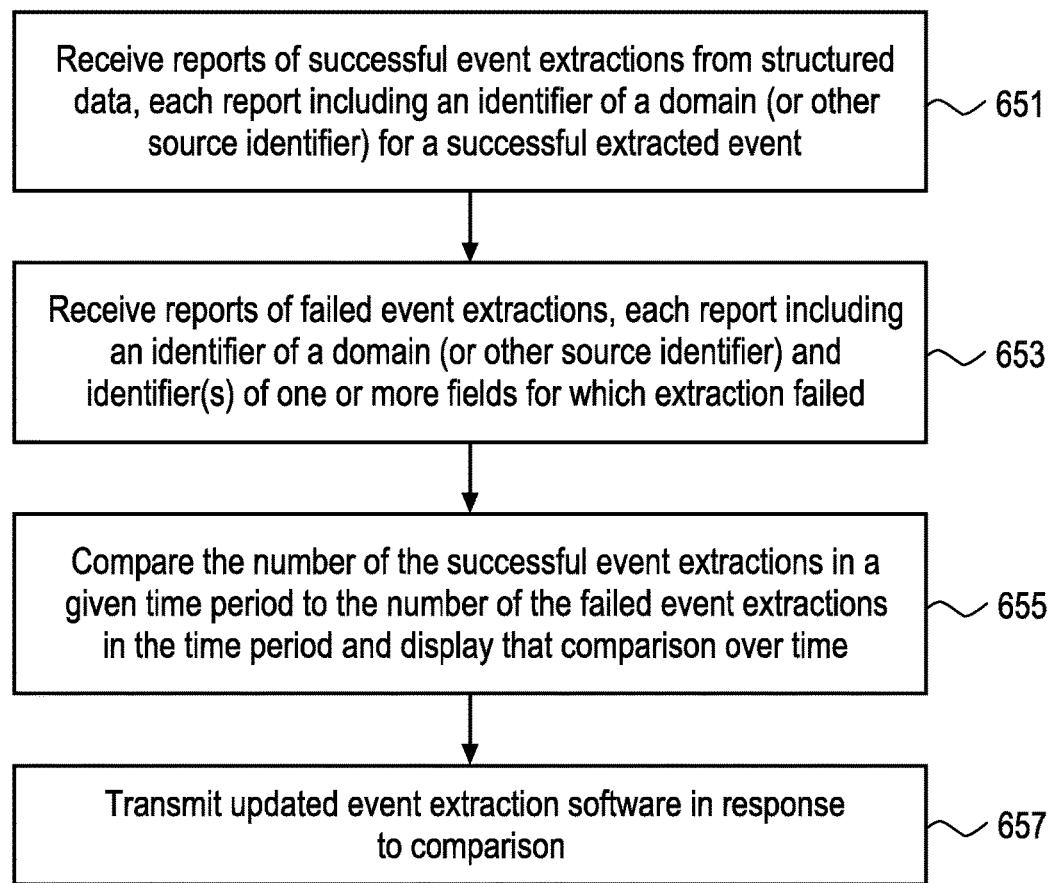
FIG. 14A is a flowchart which illustrates a method for improving event extraction software by monitoring reports of both successful event extractions and failed event extractions in a large population of devices in one embodiment.
Figure 14B:
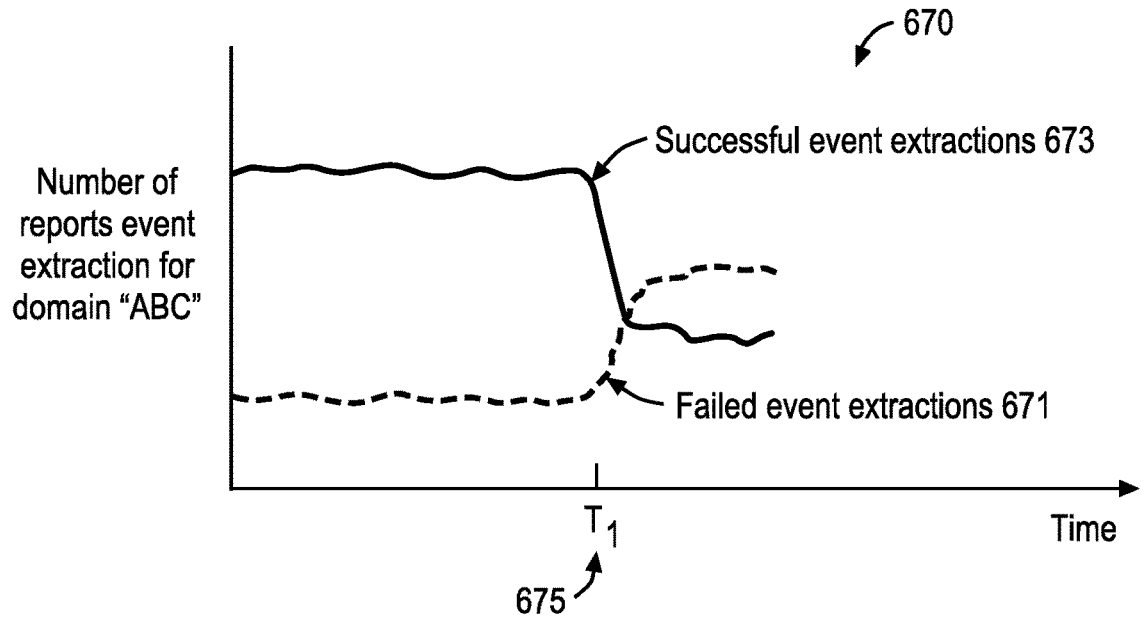
FIG. 14B shows a graph which illustrates how the method of FIG. 14A can be used to trigger an update of event extraction software which then can be distributed to multiple devices to improve event extraction.

Another aspect of the embodiments described herein is shown in FIGS. 14A and 14B. Oftentimes, providers of reservation services can change their web page formats or their email formats. This may result in the event extraction engine not being able to successfully extract an event anymore. These situations can be avoided, in some embodiments, by monitoring the success and failures of event extractions on many devices used by users over a period of time. In one embodiment, this can involve tracking the success and failures across all categories of events (such as the categories shown in FIGS. 12A through 12F) for all providers in all languages. FIG. 14A shows an example of a method which can provide this tracking. In operation 651, reports of successful event extractions can be received from many client devices, and each report can include an identifier of the domain (or other source identifier) for a successfully extracted event. The report can also include a set of metadata about the event and the document containing the structured data from which the event was successfully extracted. In one embodiment, the report can include a date indicating the date of extraction in addition to an identifier of the domain. In operation 653, reports of failed event extractions can be received from many devices on a given date. Each report can include an identifier of the domain (or other source identifier) and one or more identifiers of one or more fields for which extraction failed. These identifiers can be considered an error message which indicates the type of error on a given date for a given domain. In one embodiment, these metrics can be transmitted by a plurality of client devices on a daily basis and can be collected on one or more server systems in a privacy preserving way, such as without user identifiers, etc. and can be used to establish a baseline. The baseline can be established by, for example, operation 655 which compares the number of successful event extractions in a given time period to the number of failed event extractions in the same time period and displays that comparison over time. In one embodiment, the display can appear like the graph 670 shown in FIG. 14B which tracks over time successful event extractions 673 relative to failed event extractions 671 for the same domain over the given period of time. The Y axis shown in FIG. 14B shows the number of reports of event extraction for a particular domain. It can be seen that at time 675 (time $T_1$) the provider at domain "ABC" probably changed a format in a web page or email which has affected the accuracy of the event extraction process for one or more fields from the provider at domain "ABC". This comparison can reveal a high deviation from the baseline indicating that the event extraction engine may need to be modified. In one embodiment this can involve acquiring sample documents from the affected domain (for example domain "ABC"). This can be done, for example, by going to the website of the affected domain and making a reservation which is then canceled and collecting sample documents such as email confirmation documents and web page confirmation documents. These sample documents can then be run through an event extraction engine to allow the event extraction engine to be modified to allow the sample documents to be properly processed to extract an event successfully. Once the event extraction software has been modified based upon this testing, it can be transmitted to the plurality of a user's client devices in operation 657.

Figure 15:
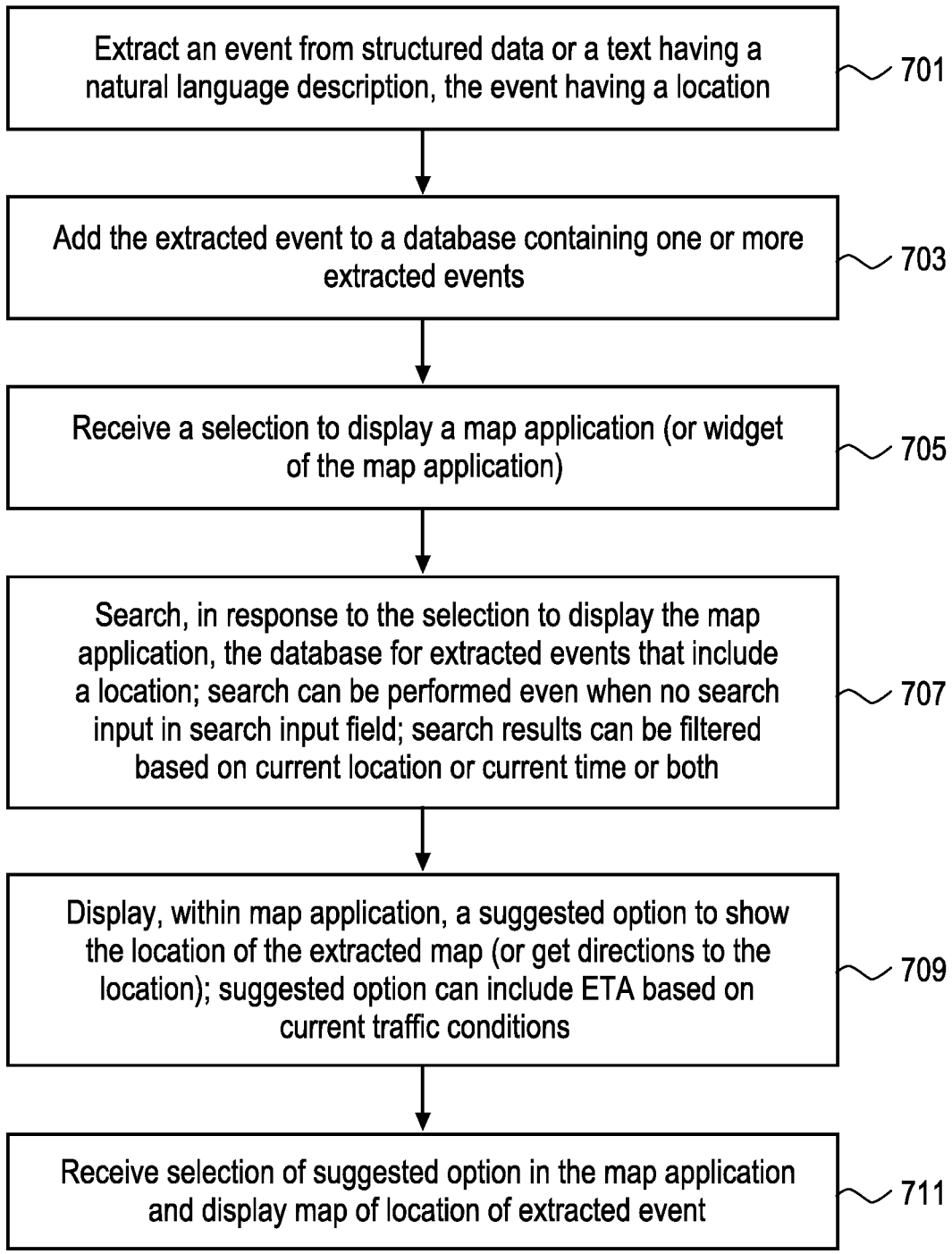
FIG. 15 is a flowchart which illustrates a method in one embodiment for extracting events and using those extracted events to suggest locations in a map application.
Figure 16:
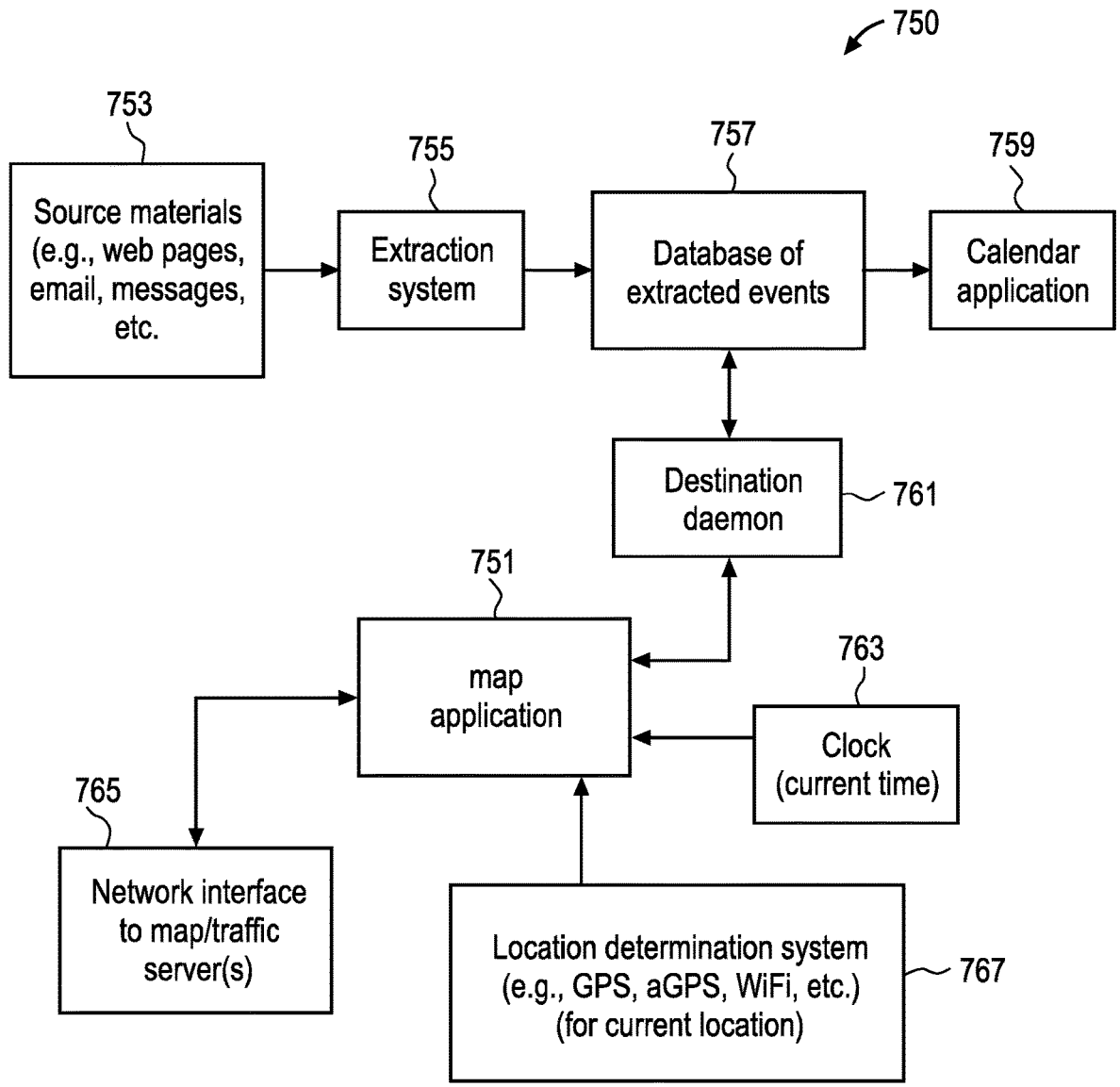
FIG. 16 shows an example of a system which can be used with a map application to suggest locations that are in one or more extracted events.
Figure 17:
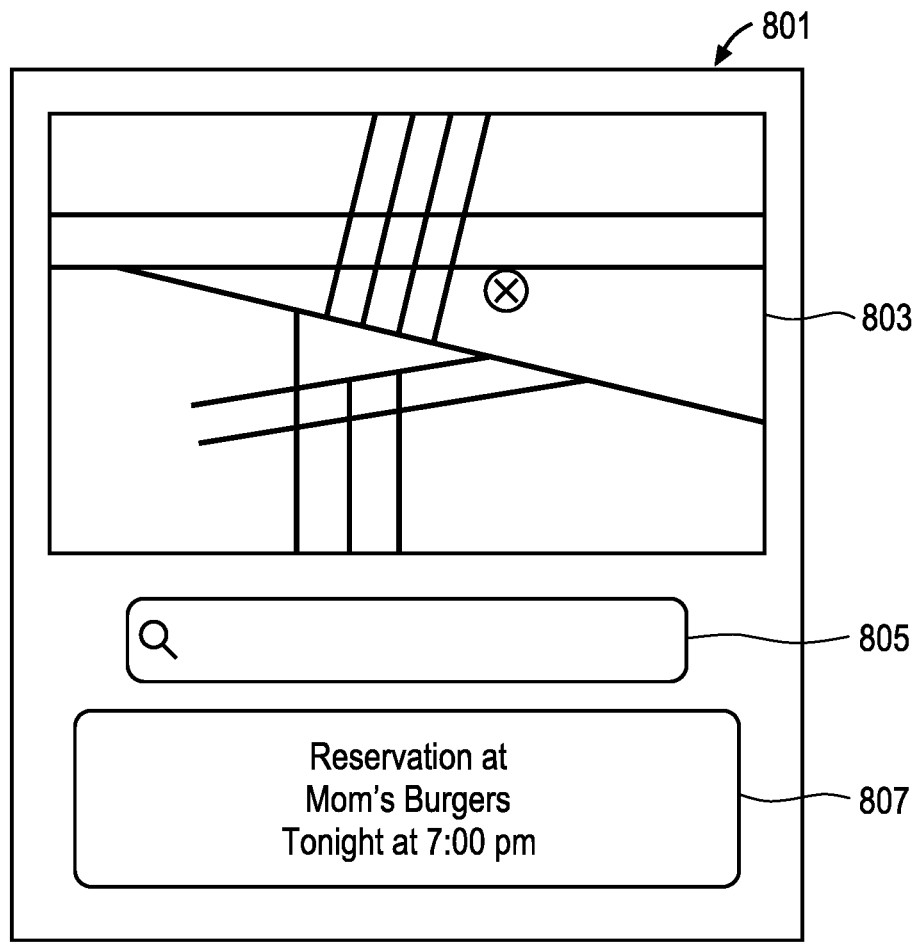
FIG. 17 shows an example of a user interface of a map application which can display a suggested location that was obtained from a database of extracted events.

FIGS. 15, 16, and 17 show another aspect of the embodiments herein which relate to automatic searches done in response to, for example, the selection by a user to display a map application. The method shown in FIG. 15 can be used with the system shown in FIG. 16 to produce the user interface 801 of a map application shown in FIG. 17. Referring now to FIG. 15, in operation 701, an event can be extracted from structured data or a text having a natural language description, where the event includes a location. In operation 703, the extracted event can be added to a database containing one or more extracted events. Referring now to FIG. 16, the system 750 can receive source materials 753 which can be processed by the extraction system 755 to produce extracted events that are added to the database 757 which contains one or more extracted events. Hence, the extraction system 755 can process the source materials 753 to perform operation 701 and 703 shown in FIG. 15. In one embodiment, the source materials can include web pages, emails, text messages, etc. In one embodiment, the extraction system 755 can be similar to the event extractor 251 shown in FIG. 4 or similar to the event extractor 407 shown in FIG. 7 or similar to the event extraction engine 550 shown in FIG. 10. In one embodiment, the extracted event can be added to a calendar application, such as the calendar application 759 shown in FIG. 16. The addition of the extracted event to the calendar application can proceed as described herein as either an automatic addition or an addition after a notification which the user can confirm manually, or in response to a user's selection of a command, displayed within a map application's user interface, to add the extracted event to the calendar, etc. Referring back to FIG. 15, at some point the user can launch or open a map application, and this is shown as operation 705 in which the system receives a selection to cause the display of a map application (or a widget of the map application). When the user opens or launches a map application, the map application, such as map application 751 shown in FIG. 16, can query a destination daemon, such as destination daemon 761 shown in FIG. 16 to cause a search to be performed of extracted events in the database of extracted events, such as the database 757. This search is shown as operation 707 in FIG. 15, and the search can be automatically performed in response to the selection to open or display the map application. In one embodiment, the search is limited to or filtered to include only extracted events that include a location which has been validated. In one embodiment, the search can be performed even when no search input characters have been entered into a search input field in the map application. In one embodiment, the search results can be filtered based on the current location or current time or both parameters. For example, events that are not within the next eight hours (for flights) and the next four hours (for any other event found in applications or otherwise contained in the database of extracted events) are disregarded or filtered out by the search process. In one embodiment, events that don't have a structured geocoded location (such as a latitude and longitude) are also disregarded. In one embodiment, events that have a location further away than 200 miles of the current location are also disregarded. The current time and the current location in one embodiment can be provided, in the system 750 shown in FIG. 16, by the clock 763 and the location determination system 767. In one embodiment, the location determination system 767 can include one or more of a GPS system or an assisted GPS system or Wi-Fi location techniques, etc. Thus, the automatic search performed by operation 707 in FIG. 15 can be filtered based upon the current location and the current time so that only events that are, for example, within four hours of the current time and within 200 miles of the current location are displayed as suggestions in operation 709 in one embodiment. The suggested options can be considered to be auto completion suggestions based upon no characters having been entered into the search input field. In one embodiment if there are no extracted events within a predetermined period of time then there would be no suggested options which are displayed in operation 709. In one embodiment, the suggested option which is displayed can include an estimated time of arrival (ETA) based on current traffic conditions obtained from map or traffic servers, such as the map and traffic servers 765 shown in FIG. 16.

FIG. 17 shows an example of the output of operation 709 of FIG. 15. The user interface 801 of the map application shown in FIG. 17 can include a map 803 which, in one embodiment, can show the streets and include an indicator of the location of the suggested option 807. It can be seen that there are no characters having been entered into the search input field 805 and thus the suggested option 807 can be considered to be a zero word auto completion suggestion found by the search through the extracted events database, such as the database 757, which search was performed in response to the opening or launching of the map application, such as map application 751 which can display the user interface 801 shown in FIG. 17. The suggested option 807 can include the name of the event and the name of the restaurant in this example as well as the time and date of the event. In the example shown in FIG. 17, the suggested option 807 shows that there is a reservation that was extracted from the source materials (such as source materials 753). This reservation is at Mom's Burgers tonight at 7:00 pm. Referring back to FIG. 15, the user in operation 711 can select the suggested option which can then cause the display of a map of the location of the extracted event which is shown in FIG. 17 where X marks the location of Mom's Burgers. In one embodiment, the events extracted and stored by the system shown in FIG. 16 can be any one of the categories shown in FIGS. 12A through 12F. In one embodiment the database 757 can enforce a restricted access requiring an access privilege or permission from, for example, the destination daemon 761, where other daemons and other applications will not get access to the database 757 because they do not have the access privilege or permission controlled by the database 757. In one embodiment, the extraction system 755 in FIG. 16 can include as part of a validation process, a method for geocoding an address by converting the address to a set of geographic coordinates. In one embodiment, the database 757 can include extracted events from one or more synchronizations with a cloud storage account, used by the system shown in FIG. 16, to obtain extracted events from other devices that use the cloud storage account. In one embodiment, the suggested option 807 can include an estimated time of arrival which is derived from data provided by traffic servers, such as traffic servers 765 shown in FIG. 16, where the traffic data is obtained via a network interface such as a cellular telephone connection or a Wi-Fi connection. In one embodiment, the map application can display a user selectable command that, when selected, causes the extracted event to be added to a calendar provided by the calendar application.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include server systems, desktop computers, laptop computers, tablet computers, smart phones, cellular telephones, personal digital assistants (PDAs), embedded electronic devices, or other consumer electronic devices.

Figure 18:
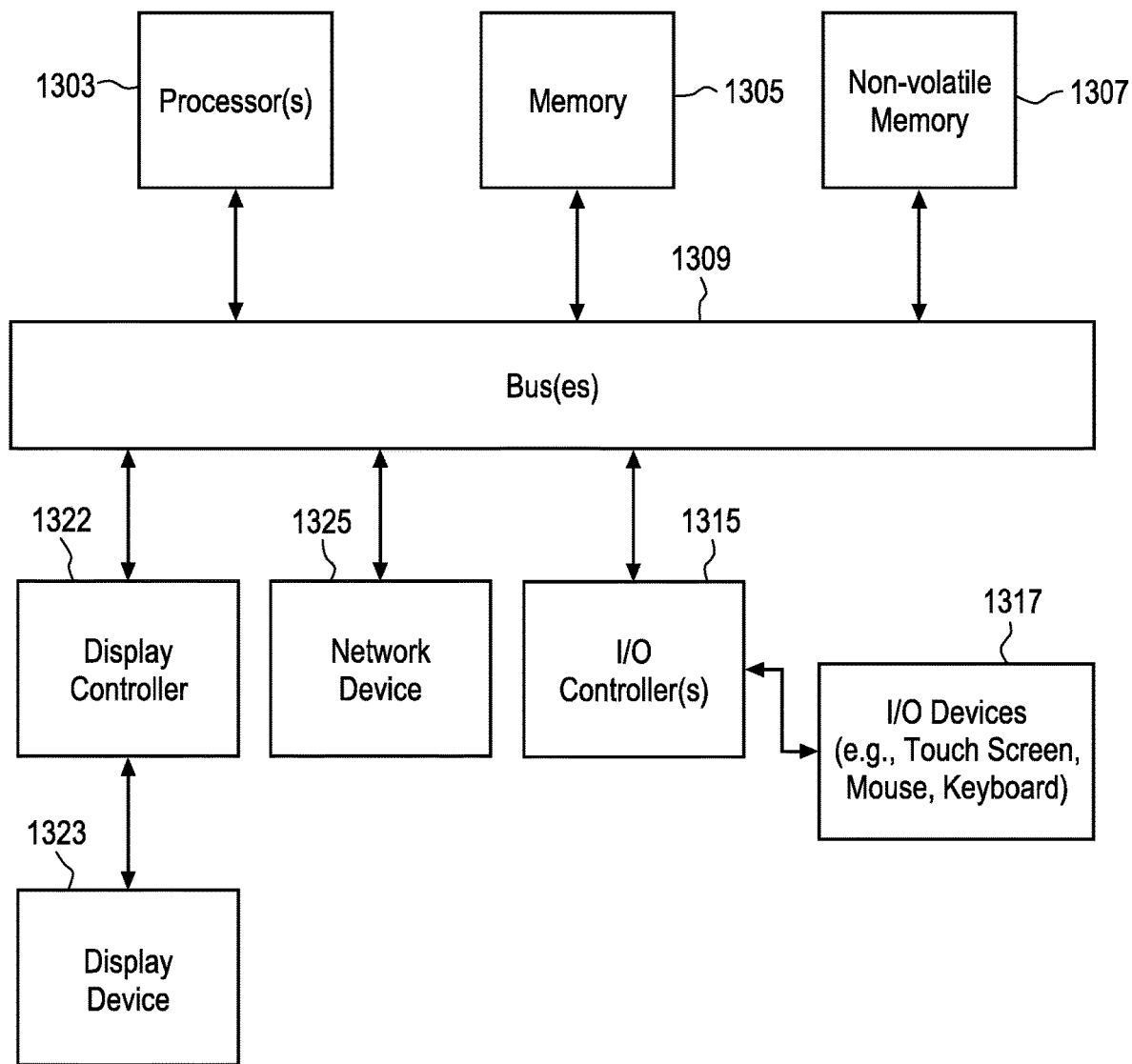
FIG. 18 is a block diagram illustration of an example of a data processing system which can be used with one or more embodiments described herein.

FIG. 18 is a block diagram of data processing system hardware according to an embodiment. Note that while FIG. 18 illustrates the various components of a data processing system that may be incorporated into a mobile or handheld device or other electronic device, it is not intended to represent any particular architecture or manner of interconnecting the components as such details are not germane to the present invention. It will also be appreciated that other types of data processing systems that have fewer components than shown or more components than shown in FIG. 18 can also be used with the present invention.

As shown in FIG. 18, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems (e.g., ROM) that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a display device 1323. The display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The input/output devices 1317 are coupled through one or more I/O controllers 1315 as is known in the art.

While FIG. 18 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., Wi-Fi, Bluetooth).

It will be apparent from this description that aspects of the present invention may be embodied, at least in part, in software. That is, the techniques may be carried out in a data processing system in response to its processor executing a sequence of instructions contained in a storage medium, such as a non-transitory machine-readable storage medium (e.g. volatile DRAM or non-volatile flash memory). In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), speaker systems with integrated computing capabilities, handheld devices (e.g., smartphones), as well as embedded systems suitable for use in wearable electronic devices.

The present disclosure recognizes that the use of personal information data (such as extracted events that can get added to a calendar of a user), in the present technology, can be used to the benefit of users. For example, the personal information data can be used to automatically populate a user's calendar with the extracted event. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services. In another example, users can select a partial opt-in in which the data is collected only when certain applications are used, or the extracted events are added to private encrypted calendars, etc.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable instructions which when executed by a data processing system cause the data processing system to perform a method comprising:
receiving, while a booking process is being executed within a domain, a plurality of web pages from the domain that are associated with the booking process;
providing, in response to the domain being in a set of whitelist domains, a title of each of the plurality of web pages;
determining, based upon characteristics of the titles of the plurality of web pages, whether a web page of the plurality of web pages is a confirmation page containing a confirmation of a completion of the booking process;
extracting, in response to determining that the web page contains the confirmation of the completion of the booking process, event data from the web page as a candidate calendar event;
adding the candidate calendar event to a calendar database without adding the candidate calendar event to a calendar;
presenting, contemporaneously with the completion of the booking process, the confirmation page and a notification including a selectable region showing at least a portion of data about the candidate calendar event, wherein the selectable region is selectable to initiate a process to add the candidate calendar event to the calendar.

2. The medium as in claim 1, wherein the set of whitelist domains is a data structure in a memory mapped trie, and further comprising comparing the domain to the set of whitelist domains in a lookup operation in the memory mapped trie.

3. The medium as in claim 1, wherein determining whether the web page is the confirmation page containing the confirmation of the completion of the booking process uses a machine learned classifier that is trained on manually labeled examples that are used to learn, based on characteristics of the title of the web page, whether the web page is the confirmation page, and wherein the event data representing the candidate calendar event is structured data.

4. The medium as in claim 1, wherein the calendar database is a private local calendar database that is encrypted if stored in a user's private cloud storage account, and the candidate calendar event is displayed in a sub-calendar that is one of several sub-calendars displayable in a calendar application.

5. The medium as in claim 1, wherein the notification includes: (a) a close command that dismisses display of the notification while retaining the candidate calendar event in the calendar database without adding the candidate calendar to the calendar; and (b) a delete command that deletes the candidate calendar event from the calendar database, and wherein the process to add the candidate calendar event to the calendar includes showing the candidate calendar event in a user interface of a calendar application, the candidate calendar event being editable in the calendar application.

6. The medium as in claim 1, wherein the notification is a coalesced notification that shows data about a set of candidate events that appear to be related.

7. The medium as in claim 1, wherein the portion of data about the candidate calendar event includes one or more of: a date of event; or a time of event; or a name of event; or a location of event.

8. The medium as in claim 1, wherein the method further comprises:
removing duplicate events from the calendar database based on one or more of: duplicate times; or duplicate titles; or duplicate source indicated by one or more domains.

9. The medium as in claim 8, wherein duplicate events are coalesced into a coalesced notification.

10. The medium as in claim 3, wherein the web page is one of the plurality of web pages received while the booking process is being executed within the domain, and wherein the web page is determined to contain the confirmation of the completion of the booking process when "confirmation" is present in the title of the web page.

11. The medium as in claim 1, wherein a web browser receives the plurality of web pages and provides the titles of the plurality of web pages to a classifier, and wherein the classifier determines whether the web page is the confirmation page.

12. A method comprising:
receiving, while a booking process is being executed within a domain, a plurality of web pages from the domain that are associated with the booking process;
providing, in response to the domain being in a set of whitelist domains, a title of each of the plurality of web pages;
determining, based upon characteristics of the titles of the plurality of web pages, whether a web page of the plurality of web pages is a confirmation page containing a confirmation of a completion of the booking process;
extracting, in response to determining that the web page contains the confirmation of the completion of the booking process, event data from the web page as a candidate calendar event;
adding the candidate calendar event to a calendar database without adding the candidate calendar event to a calendar;
presenting, contemporaneously with the completion of the booking process, the confirmation page and a notification including a selectable region showing at least a portion of data about the candidate calendar event, wherein the selectable region is selectable to initiate a process to add the candidate calendar event to the calendar.

13. The method as in claim 12, wherein the set of whitelist domains is a data structure in a memory mapped trie, and further comprising comparing the domain to the set of whitelist domains in a lookup operation in the memory mapped trie.

14. The method as in claim 12, wherein the classifier is a machine learned classifier that is trained on manually labeled examples that are used to learn, based on characteristics of the title of the web page, whether the web page is the confirmation page, and wherein the event data representing the candidate calendar event is structured data.

15. The method as in claim 12, wherein the calendar database is a private local calendar database that is encrypted if stored in a user's private cloud storage account, and the candidate calendar event is displayed in a sub-calendar that is one of several sub-calendars displayable in a calendar application.

16. The method as in claim 12, wherein the notification includes: (a) a close command that dismisses display of the notification while retaining the candidate calendar event in the calendar database without adding the candidate calendar to the calendar; and (b) a delete command that deletes the candidate calendar event from the calendar database, and wherein the process to add the candidate calendar event to the calendar includes showing the candidate calendar event in a user interface of a calendar application, the candidate calendar event being editable in the calendar application.

17. The method as in claim 12, wherein the notification is a coalesced notification that shows data about a set of candidate events that appear to be related.

18. The method as in claim 12, wherein the portion of data about the candidate calendar event includes one or more of: a date of event; or a time of event; or a name of event; or a location of event.

19. The method as in claim 12, wherein the method further comprises:
removing duplicate events from the calendar database based on one or more of: duplicate times; or duplicate titles; or duplicate source indicated by one or more domains.

20. The method as in claim 19, wherein duplicate events are coalesced into a coalesced notification.

* * * * *